US007693603B2

(12) United States Patent
Higham

(10) Patent No.: US 7,693,603 B2
(45) Date of Patent: Apr. 6, 2010

(54) PHARMACEUTICAL DISPENSING SYSTEM WITH COORDINATE GUIDANCE

(76) Inventor: John David Higham, 100 Yale Rd., Menlo Park, CA (US) 94025

(*) Notice: Subject to any disclaimer, the term of this patent is extended or adjusted under 35 U.S.C. 154(b) by 0 days.

(21) Appl. No.: 12/016,913

(22) Filed: Jan. 18, 2008

(65) Prior Publication Data

US 2009/0187274 A1 Jul. 23, 2009

Related U.S. Application Data

(60) Provisional application No. 60/886,081, filed on Jan. 22, 2007.

(51) Int. Cl.
*G06F 17/00* (2006.01)

(52) U.S. Cl. .......................... 700/242; 700/244; 221/3; 221/4

(58) Field of Classification Search .................... 221/4; 700/242
See application file for complete search history.

(56) References Cited

U.S. PATENT DOCUMENTS

| | | | | |
|---|---|---|---|---|
| 4,429,274 | A * | 1/1984 | Hamblen | 324/66 |
| 4,518,208 | A | 5/1985 | Marder | |
| 4,635,053 | A | 1/1987 | Banks et al. | |
| 4,785,969 | A | 11/1988 | McLaughlin | |
| 4,801,929 | A | 1/1989 | Instance | |
| 5,014,875 | A | 5/1991 | McLaughlin et al. | |
| 5,190,185 | A | 3/1993 | Blechl | |

(Continued)

FOREIGN PATENT DOCUMENTS

| | | | |
|---|---|---|---|
| WO | WO 01/06980 | A1 | 2/2001 |

*Primary Examiner*—Gene Crawford
*Assistant Examiner*—Timothy R Waggoner
(74) *Attorney, Agent, or Firm*—Levine Bagade Han LLP

(57) ABSTRACT

The invention describes improved methods and mechanisms for providing secure access to pharmaceutical and supply items in a clinical setting. In one version of the invention, a dispensing unit has an interior housing one or more drawers. Each drawer has one or more storage locations. The fronts of the drawers are covered with one or more locking doors, preventing access to a particular drawer, unless the covering door is unlocked. Indicators are mounted on the side of the enclosure, to guide the user to a drawer covered by an associated unlocked door. The unit further includes indicators on the sides of the drawers, to guide the user to the right storage receptacles or pockets within the drawer. Some pockets may have lids. Some of the lids may have locks. Sensors associated with at least some of the individual pocket lids may be provided to detect the lifting of a lid. Means to automatically detect the entry of a hand or fingers into a pocket may be provided. One or more loudspeakers may be mounted on the unit, to provide auditory guidance and confirmation of correct access, by sounds and voice prompts. One or more video cameras may be mounted on the unit. A processor is mounted in the unit, or, in the case of an auxiliary unit, the auxiliary unit is connected to the processor on the main unit. The processor is connected to receive signals from sensors in the dispensing unit, from the video camera, and to send signals to the indicators, and to send auditory information to loudspeakers which are designed to focus the sound specifically to the user. Modular locking drawers may be mounted in this unit also, dispensing individual doses using a method where the drawer has to be fully closed for each unit dose of medication taken.

72 Claims, 19 Drawing Sheets

U.S. PATENT DOCUMENTS

| | | | | |
|---|---|---|---|---|
| 5,267,174 | A | 11/1993 | Kaufman et al. | |
| 5,291,191 | A | 3/1994 | Moore | |
| 5,329,459 | A | 7/1994 | Kaufman et al. | |
| 5,377,864 | A | 1/1995 | Blechl et al. | |
| 5,392,951 | A | 2/1995 | Gardner et al. | |
| 5,445,294 | A | 8/1995 | Gardner et al. | |
| 5,460,294 | A | 10/1995 | Williams | |
| 5,520,450 | A | 5/1996 | Colson, Jr. et al. | |
| 5,564,803 | A | 10/1996 | McDonald et al. | |
| 5,573,506 | A | 11/1996 | Vasko | |
| 5,612,869 | A | 3/1997 | Letzt et al. | |
| 5,661,978 | A | 9/1997 | Holmes et al. | |
| 5,673,983 | A | 10/1997 | Carlson et al. | |
| 5,716,114 | A | 2/1998 | Holmes et al. | |
| 5,745,366 | A | 4/1998 | Higham et al. | |
| 5,805,455 | A | 9/1998 | Lipps | |
| 5,805,456 | A | 9/1998 | Higham et al. | |
| 5,812,064 | A | 9/1998 | Barbour | |
| 5,835,455 | A | 11/1998 | Hanson et al. | |
| 5,842,976 | A | 12/1998 | Williamson | |
| 5,846,089 | A | 12/1998 | Weiss et al. | |
| 5,905,653 | A * | 5/1999 | Higham et al. | 700/244 |
| 5,927,540 | A | 7/1999 | Godlewski | |
| 5,940,306 | A | 8/1999 | Gardner et al. | |
| 5,957,372 | A | 9/1999 | Dean et al. | |
| 6,003,006 | A | 12/1999 | Colella et al. | |
| 6,011,999 | A * | 1/2000 | Holmes | 700/231 |
| 6,021,392 | A | 2/2000 | Lester et al. | |
| 6,039,467 | A | 3/2000 | Holmes | |
| 6,065,819 | A | 5/2000 | Holmes et al. | |
| 6,109,774 | A | 8/2000 | Holmes et al. | |
| 6,116,461 | A | 9/2000 | Broadfield et al. | |
| 6,151,536 | A * | 11/2000 | Arnold et al. | 700/237 |
| 6,158,613 | A | 12/2000 | Novosel et al. | |
| 6,169,707 | B1 | 1/2001 | Newland | |
| 6,272,394 | B1 | 8/2001 | Lipps | |
| 6,286,517 | B1 * | 9/2001 | Weber et al. | 132/73 |
| 6,339,732 | B1 | 1/2002 | Phoon et al. | |
| 6,385,505 | B1 | 5/2002 | Lipps | |
| 6,511,138 | B1 | 1/2003 | Gardner et al. | |
| 6,609,047 | B1 | 8/2003 | Lipps | |
| 6,640,159 | B2 | 10/2003 | Holmes et al. | |
| 6,650,964 | B2 | 11/2003 | Spano, Jr. et al. | |
| 6,671,579 | B2 | 12/2003 | Spano, Jr. et al. | |
| 6,735,497 | B2 | 5/2004 | Wallace et al. | |
| 6,760,643 | B2 | 7/2004 | Lipps | |
| 6,785,589 | B2 | 8/2004 | Eggenberger et al. | |
| 6,895,304 | B2 | 5/2005 | Spano, Jr. et al. | |
| 6,975,922 | B2 | 12/2005 | Duncan et al. | |
| 6,985,797 | B2 | 1/2006 | Spano, Jr. et al. | |
| 6,996,455 | B2 | 2/2006 | Eggenberger et al. | |
| 7,052,097 | B2 | 5/2006 | Meek, Jr. et al. | |
| 7,077,286 | B2 | 7/2006 | Shows et al. | |
| 7,085,621 | B2 | 8/2006 | Spano, Jr. et al. | |
| 7,142,944 | B2 * | 11/2006 | Holmes et al. | 700/237 |
| 7,203,571 | B2 * | 4/2007 | Kirsch et al. | 700/236 |
| 2002/0169635 | A1 | 11/2002 | Shillingburg | |
| 2006/0237427 | A1 | 10/2006 | Logan | |

* cited by examiner

PHARMACEUTICAL DISPENSING SYSTEM WITH COORDINATE GUIDANCE

This application claims benefit of priority to U.S. Provisional Application No. 60/866,081 filed Jan. 22, 2007 which is incorporated by reference herewith in its entirety.

BACKGROUND OF THE INVENTION

The invention describes improved methods and mechanisms for providing secure access to pharmaceutical and supply items in a clinical setting.

In large medical facilities, the main inventories of pharmaceutical items are held in storage locations which are often far removed from the patients who use them. To facilitate secure and accurate delivery of the pharmaceutical items from these storage locations to the patient, a variety of systems have been proposed and put into use. In earlier systems, referred to as a "cart exchange" system, medication carts are distributed at nursing stations in the medical facility, remote from the central pharmacy, and are periodically exchanged with fully supplied carts. Typically these carts contain a 24 hour supply of medications sorted by patient into specific drawers. The "used" cart is returned to a central pharmacy of supply area where the next 24 hours of medications are replenished. Narcotics, are stored in locked boxes on the floor, requiring two nurses with separate keys and a written log, for management.

While the cart exchange system is still in use for some medications, shorter hospital stays mean that the majority of patients are more critically ill, resulting in a changing regimen of medications throughout the day. This results in many new orders needing to be brought up from the central pharmacy during the day, and a large amount of unused medication being returned. The re-stocking of these medications needs to be done accurately, and is very time consuming. As a result there has been an increasing use of automated, processor based, cabinets on the nursing floors. The processor on each cabinet monitors the access to the pharmaceutical items in these fixed cabinets, allowing the current on hand inventory and the need for replenishment to be communicated to a central processor at the central pharmacy location. These processor based dispensing cabinets were initially used for the more convenient management of narcotics, and for the ability to have a "floor stock" of common medications from which a nurse could issue the first dose of a needed new prescription, while waiting for the 24 hours supply to come up from pharmacy in the exchange cart, or on a special order basis.

Over the last eight years or so, these processor based cabinets have expanded to offering the possibility of storing the majority of medications that the patients on the floor might need during the day and night. These medications are stored in pockets within locked drawers. In other words stocks of medications are maintained at a desired par level in non-patient specific form. This is referred to as "Floor Stock". A nurse, upon entering their own personal ID, and the ID of a specific patient, will see the medications that are approved overall for that selected patient, referred to as "The Patient Profile", and in some systems, will also see what medications are due at that particular time, referred to generally as "Due Medications". The task for the central pharmacy, then, moves from selecting and filling exchange carts with a 24 hour supply of medications to each patient, to using the central processor to monitor the on-hand stock of the medications stored in the cabinets, and restocking those levels at regular intervals. A big advantage of this process is not having unused doses of medications returned to the central pharmacy. It also means that first doses (as well as subsequent doses) are immediately available.

In the final analysis, a mixture of the two systems is needed. There are still many situations that continue to require medications to be brought from central pharmacy For example, to avoid medication errors, intravenous fluids (IVs) that contain medication are now increasingly being mixed in the pharmacy and brought up to the floor for safety reasons, rather than being prepared by nurses by attaching a so-called piggy-back back medication bag, to a standard diluent bag. There are also specialized, or infrequently used medications, or those with short life, or requiring refrigeration, or that need special handling from the pharmacy. Finally there is the consideration of the time it may take nursing to select unit doses of medication at regular intervals through the day, rather than taking from a small collection of medications pre-selected by the pharmacy for a specific patient.

In addition these cabinets have provided a variety of means to only allow qualified users to have access to the cabinet, and to restrict the access of qualified users only to items to which that particular user is permitted to have access, or at least to track if users are accessing areas that are not required for the particular patient.

These cabinets also provide means to guide the user to the right pharmaceutical that is being requested, either by an indicator, which is usually a light adjacent to the pocket, or by pre-opening a locked drawer and a locked lid, the sprung lid indicating which pocket the medication of interest is in. These cabinets also provide a record of the access to that particular pharmaceutical, where that access can be detected (as is the case with the lifting of a lid that has a sensor attached).

The ideal system would only allow the user access to the single specific dose of medication requested. This is for two reasons. To ensure that only that medication is taken, as for example in the case of narcotics, where an addicted user might wish to divert extra doses for their own use. The second reason is for patient safety, to ensure that the right medication is selected. However for reasons of cost, manufacturers have provided a variety of drawers, each with different levels of restriction, and the choice is ultimately a trade off between cost, and accuracy and security.

As discussed, the ideal system would allow the user only to access the single specific dose of medication requested. In some systems, this has been provided by having metered drawers. These are drawers that have multiple doses of the same medication, but which open just enough to reveal the one, or "N" doses, requested and no more. Other systems have provided a dispenser, much like a candy or cigarette machine, that dispenses the requested medication using a rotating coil or a solenoid operated cassette, to drop just that medication into a tray that is accessible to the user's hand. A third method uses individually locking drawers, housing pockets with locked lids, each pocket containing just a single dose of a medication. These mechanisms are currently cost prohibitive for lower cost, lower security medications.

The next level of security is to use individually locking drawers, housing pockets with locked lids, each pocket containing multiple doses of a single type and dose of a medication. In accessing these medication doses, the other pockets remain locked, so the nurse is not able to take the wrong medication. They may however take the wrong quantity of the selected medication, either in error or, in the case of narcotics, for their own use. Various software systems have been provided to track the users' access and steps as much as possible, in order to track patterns of use that might indicate either erroneous access, resulting in the user taking the wrong medication, or deliberate diversion of medications. These software techniques often involve additional steps for the user. In the case of this locked pocket with multiple doses of the same medication, these software steps may include requiring that a second user be found, to act as a witness, and/or counting back the number of remaining doses in that multi-dose pocket. In the case of "count-back", if a user finds an error—for example the quantity in the pocket is less than the processor thinks is in the pocket, which would be the number entered by the previous user in counting back—then, either the current user or the previous user has either made a mistake, or has intentionally diverted one or more doses. The problem with this approach is that taking the medication is not prevented, and analysis of the error is done later on, usually at the end of the nurses' shift, after the fact, and does not point to the specific single culprit who made an error or deliberately diverted. It requires tracking down the two parties concerned, and having at least one of them feel "wrongly accused", and never having specific evidence. All these steps increase the time take to take the medication accurately and securely.

Another type of individually locking drawer uses multiple doses of the same medication in pockets with lids, but without locks, in order to reduce cost. The processor will monitor if a user accesses a pocket with medications that were not selected for the patient, and will record this as an incorrect access in an audit trail. But this is less desirable than a locked lid, since the access is not prevented, but entered into an audit trail in the processor, requiring someone to review the audit trail after the fact, find the culprit and discuss why they made that access, and ask if they took anything they shouldn't. A countback process can also be added with its advantages and disadvantages. It can be understood why it is preferable to prevent access in the first place.

Another type of locking drawer, referred to as a "Matrix Drawer", opens to reveal a "matrix" of open pockets, each pocket with multiple quantities of a single medication. While the individual drawer may be locked, the security and safety issue in this case is the fact that there is no mechanism to prevent access to medications that have not been preselected in the processor for the patient, leaving open the possibility for the nurse user to take the wrong medication in error, or to take additional medications undetected.

A focus in the last five years has been the desire to use bar code checking at the point of administration at the bedside of the patient, to avoid administering the wrong medication to the wrong patient. To this end, unit doses of medication are all being bar-coded, either by the manufacturer or by the central pharmacy in packaging machine, if the medication has been bought in bulk. In some cases, checks that have evolved at the dispensing cabinets, are more appropriately done at the bedside. With the desire to have the majority of medications available in a cabinet at the nursing station, and with the increased focus on patient safety, it is the purpose of the inventions presented here, to make the cabinets more cost effective and to increase the accuracy of the dispensing process.

While the current systems provide working methods for securely issuing medications it would be desirable to reducing the potential cost of the cabinet drawers, allowing more items to be kept in more secure single dose dispensing mechanisms or single dose drawers, or that at least have more items be kept in locked and/or lidded containers, so that the processor knows that the user is accessing the correct location. In addition it would be desirable to provide mechanisms to provide better detection of, and deterrence from, diversion in drawers that allow access to multiple pockets and/or multiple doses. It would also be desirable to ensure, particularly in the case of pockets without locking lids, that the nurse is accessing the right medication, and not accessing the wrong pocket either deliberately or inadvertently, and is taking the right quantity of those medications, and to provide means to confirm to the nurse that they are taking the right medication without introducing additional steps.

In addition to the safety aspect of taking the right medication, there is also the security aspect of ensuring that the wrong medication is not deliberately taken. In many cases, the users are having to obtain narcotic items, and the pharmacy and nursing department have serious obligations to prevent diversion. It is much preferred to prevent diversion, either by having more unit doses of medication in locked pockets, or by having better deterrents to diversion. Some of this can be achieved by lowering the cost of the cabinet and so being able to cost effectively keep more narcotic items in single dose, locked pockets. But it is also desirable to have improved mechanisms and methods to record and know after the fact, what each user did at the cabinet, both to record who the user really was, in case they are using a stolen identification, and to observe and record their actions in accessing medications in the drawers themselves, and also to inform the users that their actions are being recorded on video for example, as a deterrent to them attempting to divert.

Finally, with the increasing deployment of these systems, their availability has become mission critical and it is highly desirable to increase the systems ability to aid the nurse in the dispensing process if there are any problems or questions, and to reduce the MTTR (mean time to repair) in the event of a failure.

SUMMARY OF THE INVENTION

The invention describes improved methods and mechanisms for providing secure access to pharmaceutical and supply items in a clinical setting. In one version of the invention, a dispensing unit has an interior housing one or more drawers. Each drawer has one or more storage locations, referred to as pockets. The fronts of the drawers are covered with one or more locking doors, preventing access to a particular drawer, unless the covering door is unlocked. Indicators are mounted on the side of the enclosure, to guide the user to a drawer covered by an associated unlocked door. The unit further includes indicators on the sides of the drawers, to guide the user to the right storage receptacles or pockets within the drawer. Some pockets may have lids. Some of the lids may have locks. Sensors associated with at least some of the individual pocket lids may be provided to detect the lifting of a lid. Means to automatically detect the entry of a hand or fingers into a pocket may be provided. There may also be locked modular drawers that are not covered by doors, whose purpose is to issue doses one at a time, and which will only open to reveal a single dose to be taken. One or more loudspeakers may be mounted on the unit, to provide auditory guidance and confirmation of correct access, by sounds and voice prompts. One or more video cameras may be mounted on the unit. A processor is mounted in the unit, or, in the case of an auxiliary unit, the auxiliary unit is connected to the processor on the main unit. The processor is connected to receive signals from sensors in the dispensing unit, from the video camera, and to send signals to the indicators, and to send auditory information to loudspeakers which are designed to focus the sound specifically to the user.

In an exemplary embodiment, a user enters their identification into the processor, which may be done at a keyboard, or at a touch screen, or utilizing a biometric identification system such as a finger-print reader. The processor has a data base that knows whether the user is authorized to access the cabinet or not. The user then selects a patient from a list of patients that is updated periodically from a main processor that retains the census of patients from the hospital, and which is stored in the local processor on the cabinet. Or the user may enter the identification number of a new patient not yet in the system, or set up a new patient with a temporary identification number for the interim time until the patient data is acquired by the processor, or the user may enter "Floor Stock" or some location identification that allows items to be withdrawn or added that are not associated with a specific patient, and that withdrawal or addition can be associated with the account for that location. In some cases the user may be a person assigned to restock the system and may be adding, not withdrawing items, or may be a nurse returning an item that has been refused by a patient or was taken in error. The user now selects the medications and quantities of each medication that they wish to take or return for a patient, for Floor Stock or for the restock process.

The processor maintains a database with the list of medications or class groups of medications to which the user has access. The processor also knows the location of those medications in the cabinet and so also knows which locked doors may be unlocked for that user, and which doors must remains locked because it would give the user access to medications for which they are not authorized. The user selects one or more medications they wish to take, and the quantities of each. As they select each medication and the associated quantity, if access is allowed, they can proceed to the next medication. If not they will be told they have no access to that medication, but that they can proceed to select the next medication. When the selection list is complete, the user indicates completion to the processor, and the processor will activate the indicators to the first door, drawer and row/column indictor for the pocket for the first medication. The user opens the door, withdraws the drawer, identifies the pocket, and takes the medication, re-closing the drawer. The processor senses at a minimum the opening and closing of the drawer and will then activate the indicators for the next medication and the process is repeated until all the medications are taken.

It is necessary to guide the user to the right pocket or pocket. The exemplary method present here activates an indicator near the door that is unlocked and needs to be opened, and activates an indicator in the side of the cabinet indicating which drawer to access. These indicators may be one and the same. Within the drawer an indicator is activated from all array of indicators at the side of the drawer to identify which row contains the pocket, which contains the pharmaceutical or medical supply items that the user has requested to remove. Simultaneously an indicator within the inside of the front of the drawer is activated from an array of indicators on the inside of the front of the drawer, to identify which column contains the pocket, containing the pharmaceutical or medical supply items that the user has requested to remove. In this way the user can identify the single unique pocket at the intersection of the row and column, and can remove the requested item. To assist in the row identification, a second array of indicators can be placed at the opposite side of the drawer, one of which will be activated, to now identify both ends of the row that has the pocket containing the pharmaceutical or medical supply items that the user has requested to remove.

In some drawers there will be lids that are locked and it will be necessary for the processor to unlock these lids. In some drawers there are lids that are sensed by the processor when they are lifted, and the processor will note if the correct lid is lifted and record that information. The program will also alert the user, if an incorrect lid is lifted, and record that error. The alert can be a simple sound or text to speech or a pre-recorded message. Still other pockets may be open, without lids, and all pockets will be revealed when the drawer is opened, but each pocket may have an individual sensor that can detect when a hand or the fingers of a hand, enter that pocket, to take a medication. In all these cases, the processor has positive confirmation that a pocket has at least been accessed, even though it cannot be certain, in the case of multiple doses of the same medication in one pocket, how many items have actually been removed. In the case where there is just an open pocket and no sensor, the processor may only know that the pocket has been accessed by the opening and subsequent closing of the drawer and/or the entry of a confirmation by the user into the processor keyboard or touch screen, that the medication has been taken.

In another exemplary embodiment, in the case where the pockets are symmetrically arrayed in rows and columns, there is a locking mechanism for each individual pocket. There is an array of release mechanisms across the width of the inside of the drawer, each release mechanism able to lock or unlock all the lids in the row associated with that release mechanism. In addition there is an array of release mechanisms from front to back of the drawer, each release mechanism able to lock or unlock all the lids in the column associated with that release mechanism. With all release mechanism in locked position all pockets are locked. Activating one release mechanism into its release position across the width of the drawer, and one release mechanism into its release position from front to back, will unlock a single lid at the intersection of that row and column of those release mechanisms.

In an another exemplary embodiment, the sensors on an individual pocket send a signal that a pocket has been accessed. A mechanism for detecting the opening of lids of pockets containing pharmaceutical or medical supply items in a drawer is described in the case where the pockets are symmetrically arrayed in rows and columns. The lids are provided with arms extending into the body of the drawer, the end of the arm formed into a tab. An array of light sources are placed on the interior of one side of the drawer and corresponding light detectors are arrayed on the interior of the other side of the drawer, at least some of the light/detector pairs positioned so that the movement of a lid and associated tab as the lid is lifted, will break the beam of light between the source and receiver. It is preferable that the light source be infra-red to avoid interference from visible light. Similarly, an array of light sources is provided on the interior of the front side of the drawer and a corresponding set of light detectors is arrayed on the interior of the back side of the drawer, at least some of these light/detector pairs being positioned so that the movement of a lid and associated tab as the lid is lifted will break the beam of light between to source and receiver. In this way, the lifting of a specific lid will break in source-receiver pair in the cross direction, and one source-receiver pair in the front to back direction, allowing the processor to identify the single pocket at the X-Y intersection of that row and column.

In another exemplary embodiment there are modular locking drawers in the enclosure. These drawers are designed to contain unit doses of medications that are dispensed one at a time. The drawers are designed so that to advance to a second medication the drawer must be returned to it's fully closed position for each take. If, of course, a subsequent dose is not authorized to be taken, then the drawer is relocked. When the drawer is restocked there is a reset mechanism, that is operated by the restock technician, to reset this sequencing mechanism to the first full pocket.

In a further exemplary embodiment, a video camera is placed at the top of the cabinet pointing downward and another is placed in the center of the cabinet facing the user. When the user logs in, either using the processor keyboard or using one of many biometric identification devices that may be placed on the cabinet and connected to the processor, a process of video recording begins, recording both the face of the user and, utilizing the downward facing camera, any activity that the user may undertake as they withdraw medications from pockets in withdrawn drawers. At the completion of the user session, the video recordings are attached to the transaction record for that user in that session, and are stored in the processor.

This method for detecting access to a pocket does not work if there is no lid, so another method is described. A pair of metal plates in the wall of each individual pocket, form a capacitor. The change in dielectric and associated capacitance when a hand or the fingers of a hand enter the pocket, is detected using a sensitive bridge circuit. This bridge circuit is self balancing over time to accommodate the fact that the capacitance also varies due to the increase or decrease in dielectric constant in the gap between the capacitor plates created by the varying contents of the pocket itself. Since the circuit is primarily looking for an increase in dielectric when fingers are inserted, the bridge balancing circuit balances out decreases in capacitance rapidly, but remains sensitive to increases in capacitance. The detection of the dielectric change only occurs when the processor has recorded that a user has logged into the processor and that the medication retrieval process is not finished. In this way extraneous changes are ignored.

DETAILED DESCRIPTION OF THE INVENTION

Figure 1:
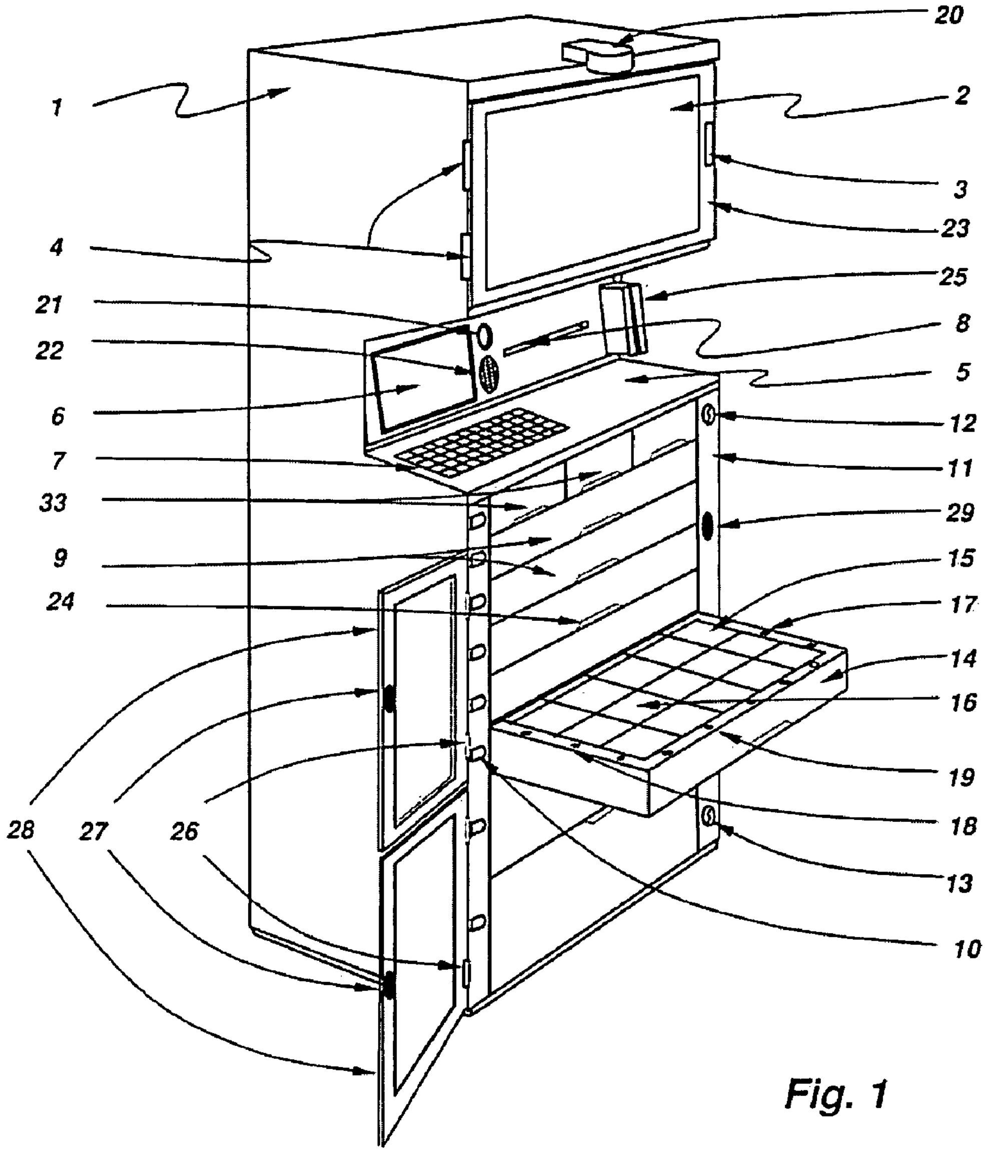
FIG. 1 illustrates a dispensing unit having a processor, control interface, speakers, video cameras, and a number of non-locked drawers containing pockets, with guiding indicators. The drawers are covered by lockable doors. There is also a storage compartment covered with a lockable door over it. There are also modular, locked drawers not covered by doors

An exemplary dispensing unit is shown in FIG. 1. Dispensing cabinets similar but not identical to this drawing are common in acute care hospitals. However, the purpose of the inventions presented here is to provide methods that allow these cabinets to provide better functionality at lower cost, and to provide improved serviceability, in particular to provide faster mean-time-to-repair (MTTR), since these systems need to be available twenty-four hours a day, seven days a week, year in, year out.

In FIG. 1, an enclosure 1 is shown that contains a number of functional items. A processor with screen 6, which is preferably a touch screen, and a keyboard with mouse pad 7 is placed at a convenient height for a user. The console area also contains a printer enclosed within the cabinet with a slot 8 for the paper to exit, and optionally an automatic identification device, 25, which could be a magnetic card reader, a bar code reader or one of many biometric devices such is a finger print, face recognition or hand recognition device for example. A work surface 5 is provided on which a user can place papers, and/or a tray of containers to receive medications or other supplies taken from the cabinet. The enclosure 1 contains a number of different means for storing items to be a dispensed. In one case, a compartment 2 is covered by a locked door 23, with hinges 4 and a handle 3. There also may be drawers 9 with handles 24 for opening them, and access to these drawers is controlled by locking doors 28 that selectively cover the drawers 9, the doors having hinges 26 and a locking pawl 27 that mates with a lock mechanism 29 on the cabinet.

Figure 2:
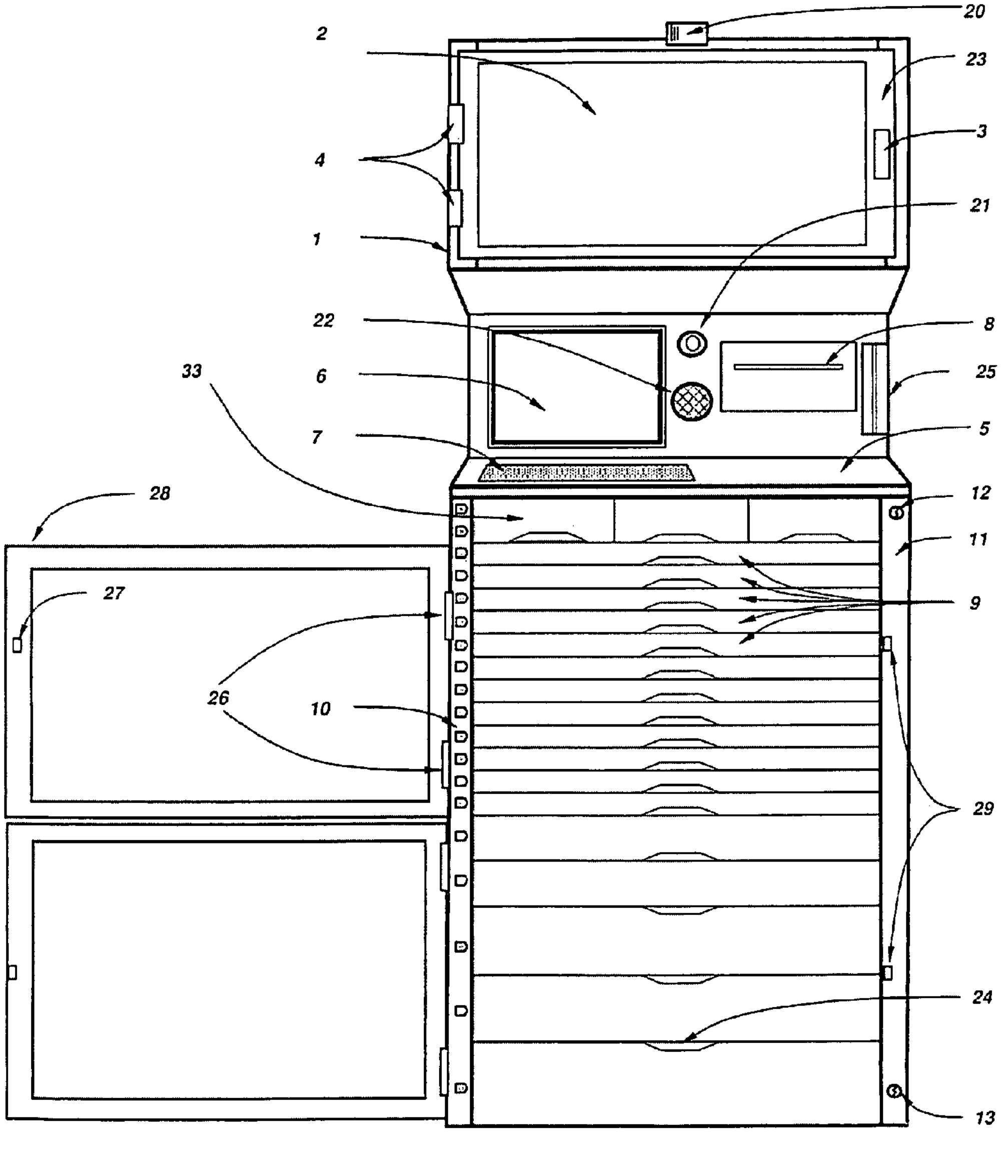
FIG. 2 illustrates the same cabinet viewed from the front.

Within the drawer there are pockets. These pockets may be open matrix pockets, or lidded pockets, and the lids may be locking or non-locking, and may, or may not, be equipped with sensors to detect when they are opened. On the side of the cabinet there are arrays of indicators 10 to guide the user as to which compartment or drawer to open. These sensors may be inside the door, and only revealed when the door is opened, or may be outside the door and visible both with the door closed as well as opened, allowing the user to see which drawer is indicated during the time they are approaching the door to open it, and in fact guiding the user to the right door to open to access the required drawer. There are also modular drawers 33 that are not covered by doors, whose purpose is to dispense one dose of a single medication at a time. These drawers are designed so that the drawer must be fully closed and opened again for each dose taken, allowing the processor to count the doses taken. To provide convenient and fast access to electronics for repair, a pair of locks 12 and 13, allow a cover 11 to be removed. Removal of the cover gives access to mechanical or electronic release mechanisms concealed from tampering by the cover, which open other covers of the cabinet, or to release other hidden mechanisms and circuit boards from the front for service. A pair of locks is provided so that it might be the policy of the hospital that two people, each with separate and different keys, would be required to access the system which may contain narcotics. The locks are mounted on a simple cover, so that, should a key be lost or stolen, and the security of the system compromised, it is inexpensive to re-key the system. FIG. 2 shows a front view of this cabinet of FIG. 1.

Figure 5:
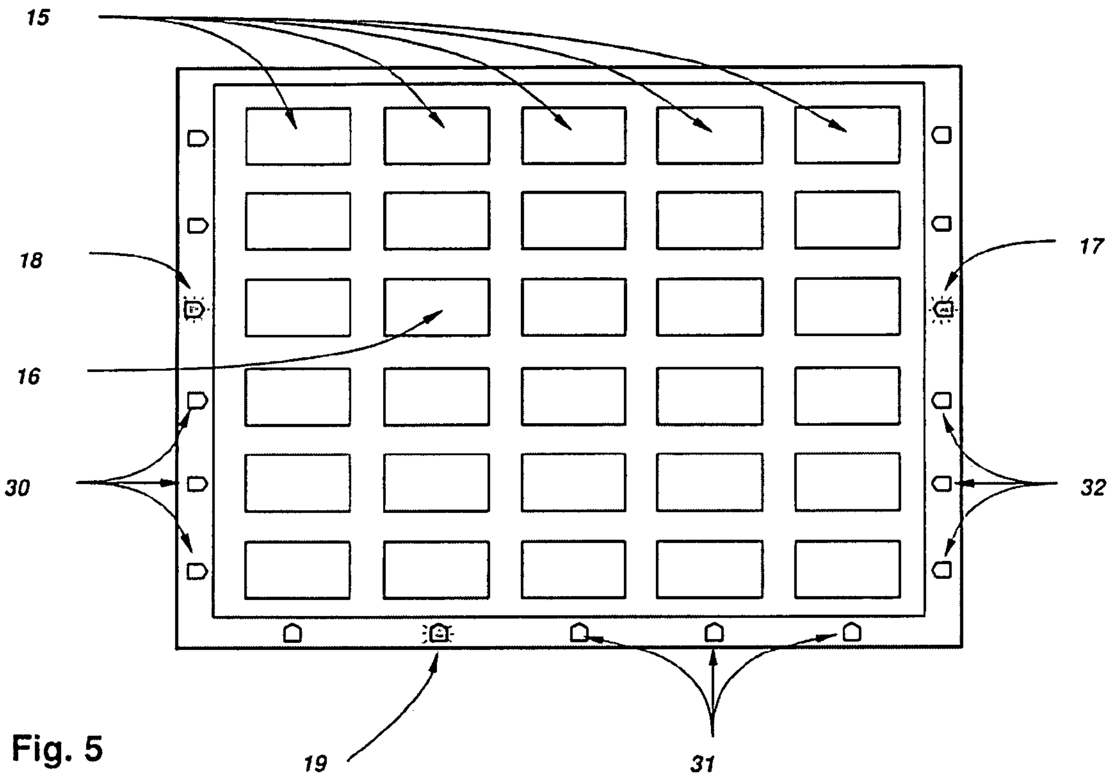
FIG. 5 illustrates the top view of a typical drawer, showing the indicators arrayed along the edges of the drawer, which are used to guide the user to the correct pocket by indicating the row and column containing the pocket of interest.

The drawers 9, of which an open one 14 is shown in FIG. 1, is shown in more detail in FIG. 5, with multiple pockets 15. There are two arrays of indicators 30 and 31, in FIG. 5, where the indicators are typical lights, on at least two edges and preferably a third array of indicators 32 on the third edge. To indicate the pocket of interest, 16 from which the medication should be taken in this illustrative example, the "X" and "Y" coordinates of the pocket are shown by indicators 19 (the "X" coordinate) and 18 (the "Y" coordinate). The X-Y pattern made by the pockets themselves allows the user's eye to easily see at which pocket, 16, the X-Y lines from these coordinate indicators meet. This can further be enhanced by providing a second "Y" coordinated indicator 17 on the other side of the drawer. Since the drawer is not always fully retracted, it is not useful to provide a second "X" coordinate indicator on the back side of the drawer opposite to 19, since that indicator would be concealed until the drawer was fully open, and in many cases it may not be necessary to fully open the drawer to access the desired pocket. However, a second "X" indicator could be provided by placing that indicator on the cabinet frame just above the drawer.

For an eight by eight pocket array, there are sixty-four pockets and if an indicator is provided adjacent each pocket it would require sixty-four indicators whereas, the method and mechanism shown here requires sixteen indicators—or a maximum of twenty-four indicators, if the option to have indicators on both sides of the drawer is chosen. This means less cost. In addition, since the indicators are on the side of the drawer, this allows the possibility to have a standard (dense) array of indicators on the drawer and the drawer to be conveniently re-configured by inserting a new pocket liner in the standard drawer, with a different array of pockets. By entering the new configuration into the processor, the right selection of indicators will be used from the dense array, to line up with the pocket arrangement for the new liner. In this manner, just one drawer might be provided, with standard electronics for the indicators, reducing the cost for manufacture, and allowing the hospital to re-configure systems just by replacing the insert in a drawer, not having to replace the whole drawer mechanism.

In most cases however, the user needs access to all drawers, or, if a user is restricted, it is usually to a broad class such as narcotics, that can be kept in one group of drawers. Lower costs are also achieved by having just locking doors 28, over inexpensive molded plastic drawers 9. Although certain users may need to be restricted from accessing certain medications, this is usually to a broad class or group of medications like narcotics.

The camera 20 in FIGS. 1 and 2, should be able to record the actions from a vertical position, unless the user is deliberately trying to conceal their actions. If the pockets have access detection mechanisms, through lid sensors or, in the case of open pocket matrix drawers, sensors that detect the presence of fingers entering the pocket, then the speakers 22 on the cabinet in use, can optionally state the name and dose of the medication being accessed to confirm that the user is taking the right medication. This speech can either be text-to-speech, but will preferably be a sound file recorded by the pharmacist with correct and accurate pronunciation, recorded when the pharmacist enters the medication initially into the data base.

Figure 17:
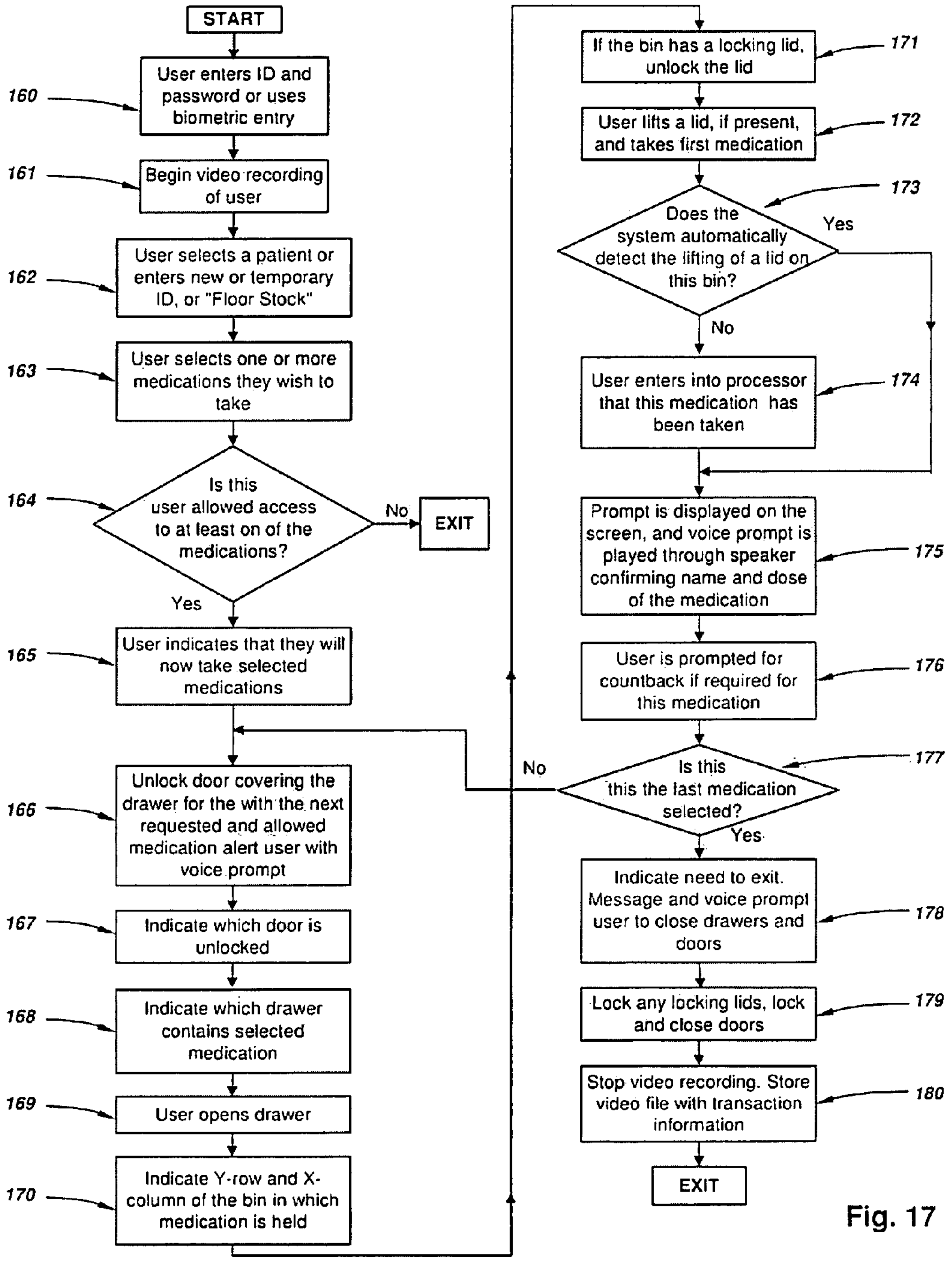
FIG. 17 to 19 show a flow chart of the typical work flow at the cabinet and variations on the speaker shapes which may be utilized in the cabinet, respectively.

A typical user process is shown in FIG. 17, and the following description will refer to the steps depicted in FIG. 17 as well as refer to the physical components depicted in FIG. 1. A user approaches the cabinet and enters their identification in step 160 of FIG. 17 on the keyboard 7 of FIG. 1, or using an automatic entry device 25. The processor may optionally ask for the entry of a user password on the screen 6, to be entered on the keyboard 7. At this point the processor will know the unique identification of the user. In step 161, the processor will begin recording the user and their actions on video cameras 21 and 20. Video recording will not necessarily be at the full 30 frames per second, but will more typically be at a lower speed to conserve memory, possibly 5 frames per second or less. It will also be preferable to record at a lower resolution, say 320 by 240 pixels and to use an effective compression technique such as MPEG-4. The processor, knowing the user ID, now knows the user, and so to which medications the user is allowed access, and will only open doors for those appropriate drawers or compartments.

In step 162, the user may now select a patient from a list held within the processor, or enter a new or temporary patient ID or select "Floor Stock" in the case where a medication is to be taken for future use, or select "Remove Inventory" if the medication is being moved to an alternate secure location, or select "restock" if they are adding inventory to the cabinet. In step 163, the user will pre-select one or more medications they wish to remove, entering the quantity of each and reading any alert information provided by the system, whether it be patient specific, such as allergy alerts, or medication specific, such as route of administration. At this stage the user may also be asked to enter information, such as the reason for the dispense or return of the medication. The processor will also know, at step 164, whether the user is allowed access to each medication selected. If not, the processor will alert the user to that effect, but will allow the user to continue to select other medications to which the user maybe does have permission to access.

When the user has selected all the medications they wish to, and are allowed to, take, they indicate on the screen in step 165 that they now wish to take these preselected medications. The processor in step 166 will unlock the door 28, covering the drawer 9, containing the first medication that has been selected. In step 167 the processor indicates which door, 28, is unlocked by activating the appropriate indicator 10, and in step 168 indicates which drawer to withdraw from the cabinet. In this case the indicator 10 fulfills both purposes. In step 169 the user, having opened the unlocked door, opens the drawer, and in step 170 the Y-row, 13 and 17, and X-column 19 containing the pocket are indicated. If the pocket has a locking lid then that lid will be unlocked in step 171, and if a lid is present the user lifts the lid in step 172 and takes the medication. If the system detects access to the pocket, either by sensing the lifting of the lid or by sensing the presence of the users fingers in the pocket, then in step 175 a voice prompt is automatically played, using the sound file stored in the processor or using text to speech, reciting the name and dose of the medication. Additional information can also be included in the voice prompt including patient information such as allergy warning, and medication specific information such as route of delivery, or the need for a witness, and other useful information. If access to the medication is not automatically sensed, then the user needs to return to the screen in step 174 to indicate the medication has been taken, which then triggers the voice prompts and associated displays.

In step 176, if a countback is needed, the user can be prompted both by voice and on the screen, including reciting the current quantity the processor believes is in the pocket. When countback is completed, in step 177 the processor repeats the dispense process for the next medication, or, if this is the last medication selected, will prompt the user in step 178 to close all drawers and doors, and at this point any locking lids that have been opened will lock, and closed doors will be locked, step 179. Video recording will cease in step 180 and a record of the whole transaction sequence together with the video file will be stored in the local processor and also sent, as a periodic update to the central server. It is preferable that doors 28 are spring loaded so that if the doors are opened beyond ninety degrees, they stay open, but if they are returned to any position less than 90 degrees open, the door will swing shut, and that process will initiate re-latching and locking of the door. It would be unusual for a care-giver to not shut drawers and doors, since they are acutely aware of the importance of keeping medications secure, but if that were to happen, then, after a short period, the cabinet should give voice prompts that the doors and drawers need to be shut. Those prompts should be given until that action is complete. A short waiting period is desirable, to give time for a normal user to complete the task of closing the doors without being bothered by a prompt to take an action they know must be performed. In general, voice prompts should be brief, and preferably tailored to the user to give essential safety information, but not to annoy.

Figure 6:
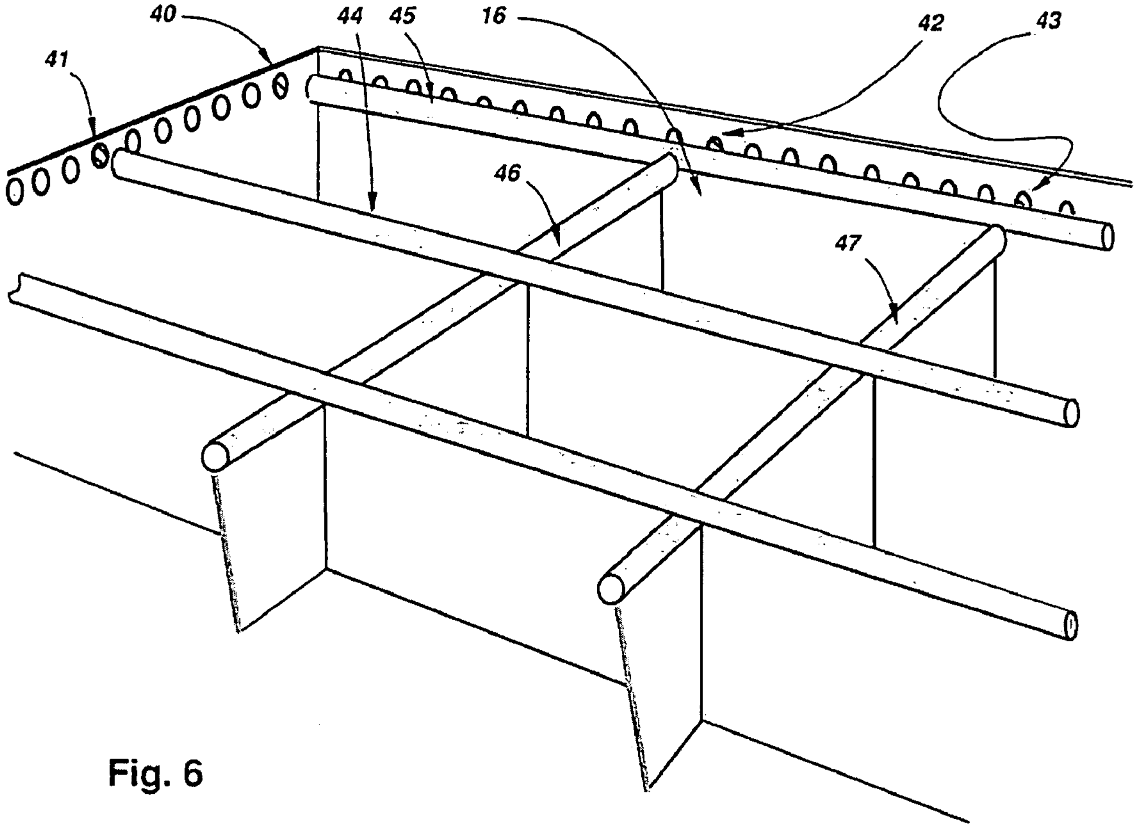
FIG. 6 illustrates a mechanism for indicating the correct pocket using plastic light pipes that are built into the top of the dividers of the compartment.
Figure 7:
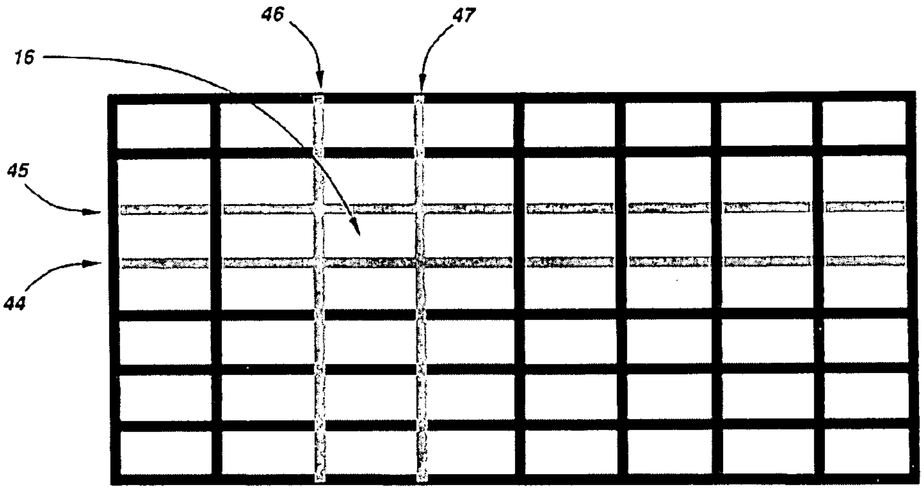
FIG. 7 shows the top of a drawer that utilizes the light pipes showing how the pocket of interest to the user, is highlighted on all four sides by the light pipes.

FIG. 6 shows an alternate way to provide the less expensive "X-Y" coordinate indication of the pocket of interest 16, using indicators that are not adjacent to the pocket. This would typically be used in so-called "matrix" drawers that have no lids. In this case the light from a relevant pair of indicators on the side of the drawers, 40 and 41, are sent down light pipes 44 and 45, arrayed across the width of the liner in the drawer, to indicate the "Y" axis coordinate. Similarly a pair of indicator lights, 42 and 43, on the front or back side of the drawer send light down light pipes 46 and 47, arrayed from front to back in the liner in the drawer, to indicate the "X" axis coordinate. The liner containing these light pipes could be a single molding, or could be intersecting pieces that could be assembled to make a matrix of pockets. Regardless, the effect is to illuminate the "X-Y" lines to help guide the user's eyes to the pocket of interest, 16, at the intersection of the X-Y coordinates. The indicator lights are still on the side, but when light is passed down a light pipe, while much of the light is totally internally reflected, various additives in the plastic can cause the whole pipe to also glow, providing the appearance of a lit line across the drawer. This is illustrated more specifically in FIG. 7, which is a top, or plan view of the drawer, which clearly shows how the lines created by the light pipe indicate that pocket 16 is at the intersection.

Figure 3:
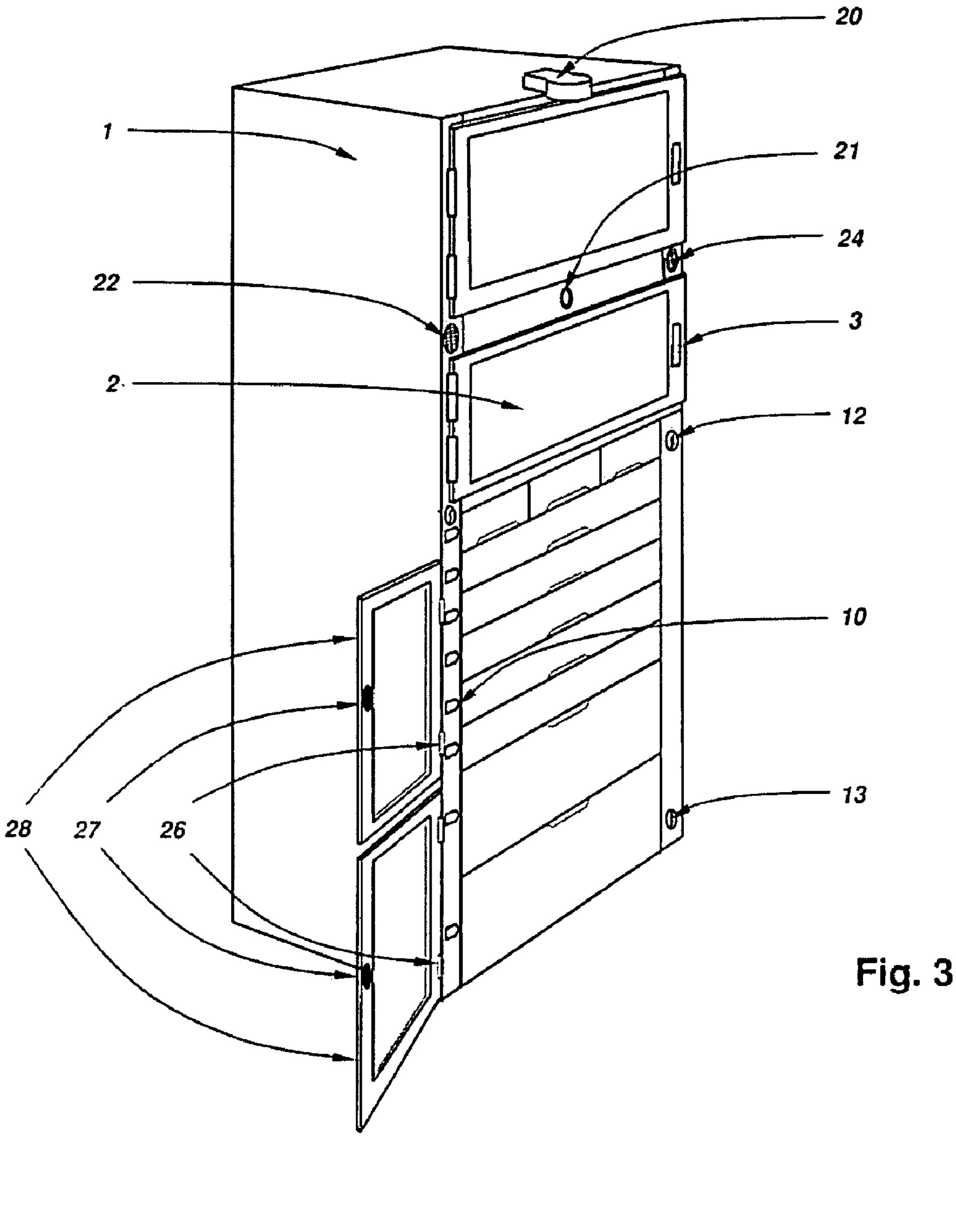
FIG. 3. illustrates an auxiliary dispensing unit which is the same unit as in FIGS. 1 and 2, but without a processor interface and with an additional storage compartment.
Figure 4:
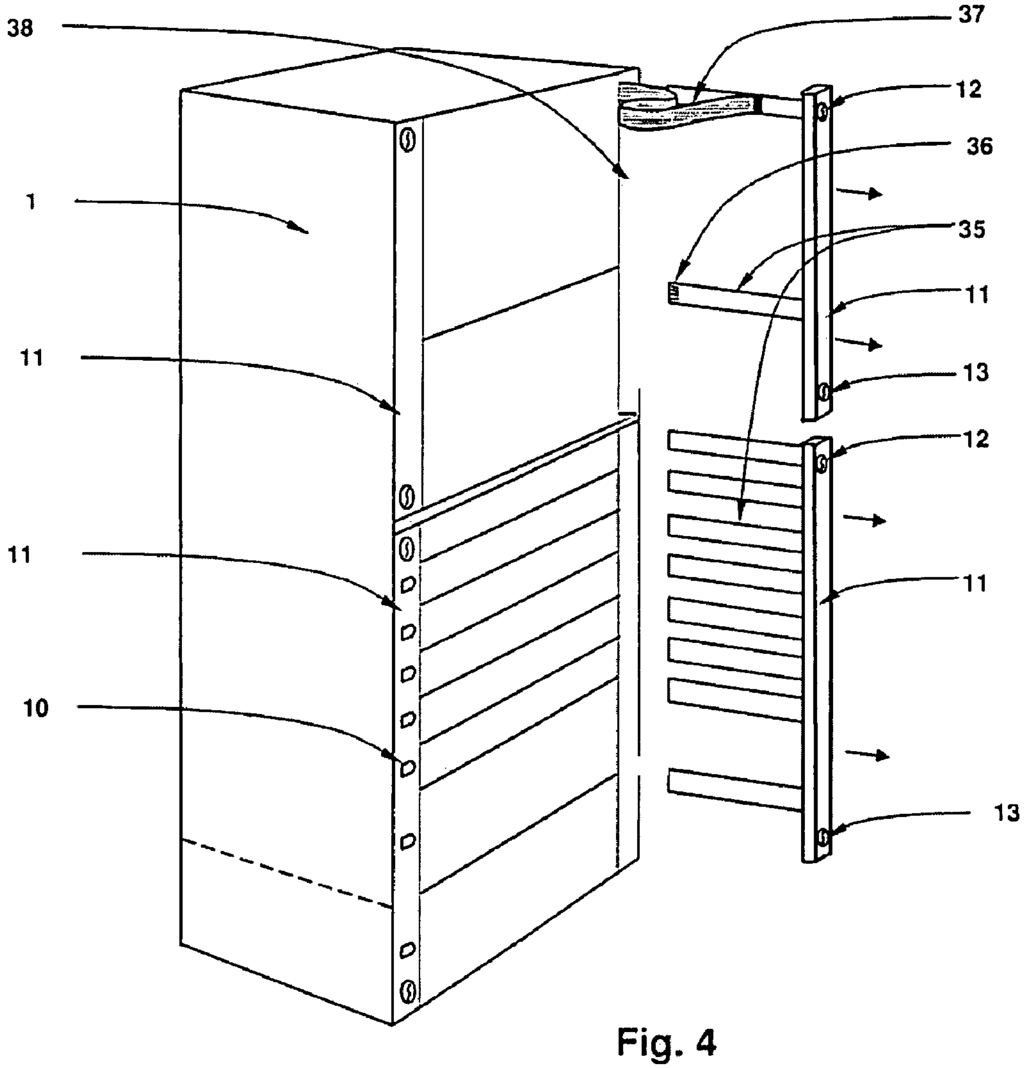
FIG. 4 illustrates the dispensing unit of FIG. 3 with the dual-lockable service sections withdrawn from the cabinet to reveal the circuit boards and flex cable connections.
Figure 18:
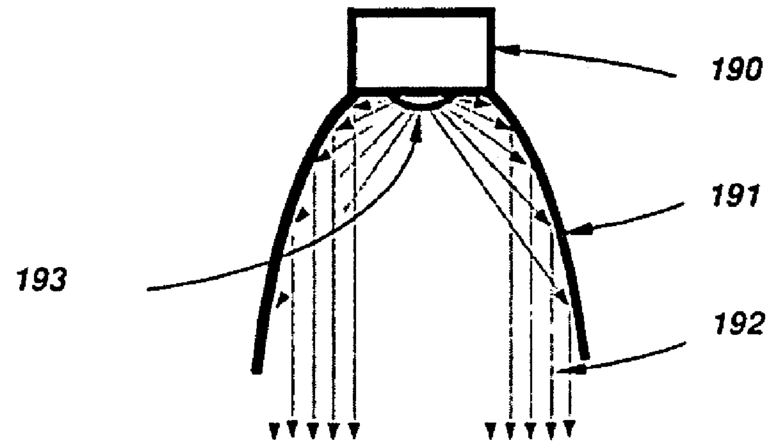
Figure 19:
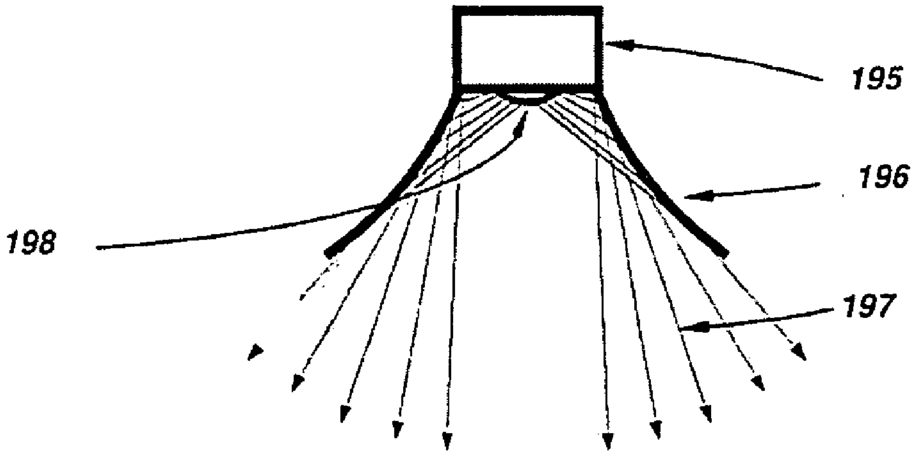

An important aspect of a dispensing system is accuracy. While a preferred method that has been described in the past is to only provide access to a single type of medication by placing each type in locked pockets and only opening the lid of the right pocket, this method is expensive. The invention proposed here, involves detecting when a pocket is accessed and providing a voice prompt which states the name and dose quantity of the medication being accessed. The voice prompt could be provided by a text-to-speech process, but, because of the risk of mispronunciation of hard to pronounce drug names by text-to-speech software, it would preferably be a sound file of the recorded voice of the pharmacist, made when the medication was originally entered into the database. The sound file would be transmitted along with all the other dug information needed, to each dispensing cabinet processor and become a part of the data base. Text-to-speech would be used in an emergency if the sound file was corrupted or missing. An important aspect is the ability for the user to clearly hear the spoken description of the medication, while not making the sound so loud that it disturbs other workers or patients. To this end the speaker 22, or speakers 22 and 24, shown in FIGS. 1, 2 and 3, are placed at the height of the average user and are pointed in the direction of their ears. Because users may also be bending down to take medications, additional speakers low in the cabinet are recommended. This allows minimum volume with maximum possibility for the user to clearly hear. Triggering of the sound file is either from the lifting of a lid or from a capacitance bridge circuit that detects the presence of the fingers in a particular pocket. It is also desirable that the speakers focus the sound, rather than disperse it. To that end a concave parabolic horn shape is recommended as show in FIG. 18. 190 is the speaker magnet and the sound waves emanating from the central cone 193 are reflected off the concave parabolic surface 191, causing the sound waves to travel in parallel, focusing them at the user rather than spreading out to others. This is in contrast to a typical medium to high frequency speaker shown in FIG. 19 where there is a convex horn 196 causing the sound 197 from the cone 198 to spread out over a large area, which is normally the kind of propagation that is desired. In this case it is desirable to keep the sound focused and the arrangement of FIG. 18 has advantages in this area.

Figure 14:
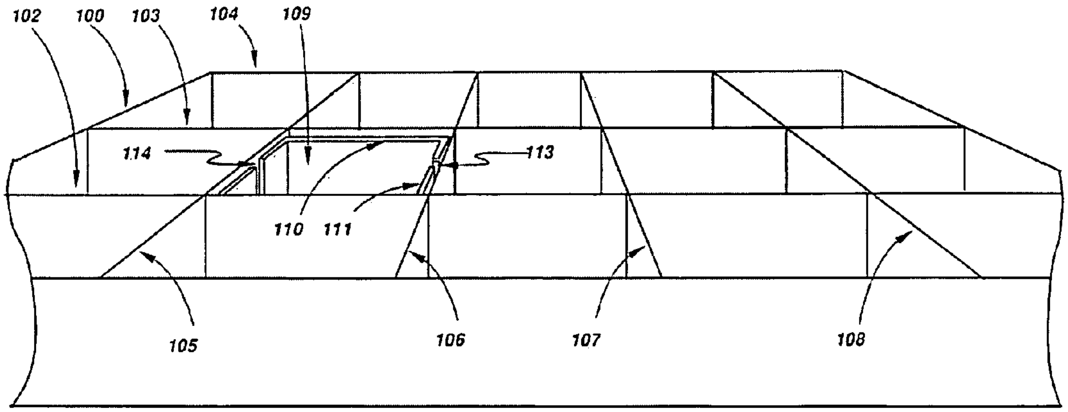
FIG. 14 shows a set of open matrix pockets, one with an exemplary pair of metal liner plates that acts as a capacitance detector of the presence of fingers entering the pocket.

Various mechanisms have been described in prior art for detecting the lifting of a lid using an adjacent sensor which is typically an optical transmitter and detector adjacent a move arm attached to the lid of the pocket, or is a magnet that attached to the moving arm attached to the pocket lid that triggers a hall effect device. For accuracy of dispensing it would also be desirable to detect when a persons fingers entered the opening of a non-lidded matrix pocket, allowing the voice prompt to recite the name and dose of the medication from the sound file previously stored in the database, or using text-to-speech from the character information stored in the database. FIG. 14 shows a mechanism and method for accomplishing this. A matrix draw consists of open pockets defined by Y-direction dividers 102, 103, 104 and X-direction dividers 105, 106, 107, 108. In this example we are focusing on a pocket 109, defined by dividers 103, 104, 105 and 106. In the walls of the dividers of each of the pockets are two metal plates 110, and 111 designed to surround the inside of each pocket and covered with an insulator. The plates that meet, but do not quite touch at points 113 and 114. These two plates form a small capacitor whose impedance is affected by the dielectric between and in the vicinity of the plates. The dielectric constant, and hence the capacitance will increase as a person's fingers are inserted into the pocket to remove a medication. This will be a very small capacitance increase and so a sensitive bridge circuit is needed to detect the change.

Figure 15:
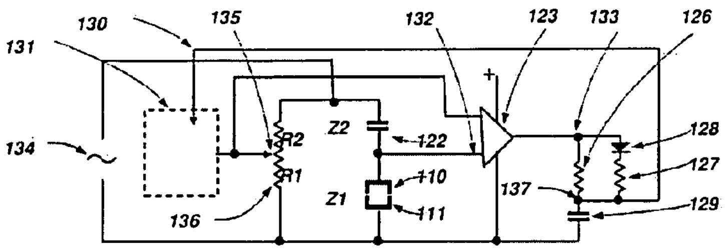
FIG. 15 shows the principal elements of an analog circuit to detect the change in capacitance of the two metal liner plates of FIG. 14

FIG. 15 shows an example of a suitable bridge circuit. The AC voltage produced at point 132 from the high frequency, low impedance AC source 134, is a function of the fixed capacitor 122 and the capacitor formed by plates 110 and 111 which has a variable impedance. To balance the bridge and make the voltage at 135 equal to 132, the effective position of a slider 135 on a rheostat 136 is adjusted. In practice, there will be no physical rheostat, but a circuit 131 that performs that function of variable resistance, that is controlled by the input level 130, 123 is a high gain operational amplifier, so any sudden increase or decrease in capacitance of the capacitor formed by 110 and 111, will cause a small change to the input of 132 causing a large change in output, either draining the storage capacitor 129 or increasing it's voltages through the resistor-diode combination 127/128 and/or the resistor 126. The resistor 127 is smaller than the resistor 126 and in combination with the diode 128, creates a SDFS (slow-depart-fast-return) effect on the capacitor 129 voltage at 137, whose purpose will be explained in the next Figure. Voltage changes occur slowly on line 130, and this means that the circuit is always slowly balancing itself through the voltage adjuster 131, such that the capacitor voltage 137 is zero and the bridge is in balance. This is important since the capacitance of 110/111 will change with pocket content and other conditions, so it important that the circuit is constantly adjusting for these gradual changes over time (typically about 5 seconds).

The system will start looking for changes when the user has logged in, has selected the medications and has opened the door covering the drawers to begin accessing medications. Since the system is guiding the user to the right location, the system knows which pocket they should be accessing. There are three sources of sudden change in capacitance. One is when the drawer is opened. In this case the bottom of the drawer above, and it's associated contents, are suddenly no longer above 110/111, causing a sudden drop in dielectric in the area above the capacitor formed by 110/111, and we wish to ignore this change. Insertion of fingers into the pocket causes a sudden increase in capacitance and we want to detect this and trigger the voice signal to recite the sound file and confirm the name and dose of the medication. Withdrawal of the fingers, probably accompanied by a medication gripped between those fingers, causes a drop in dielectric and hence a drop in capacitance, which we also want to ignore. Returning the drawer to the closed position causes an increase in capacitance, but by this time the system knows that the cycle is complete and will ignore the signal from that pocket caused by the drawer closing.

Figure 16:
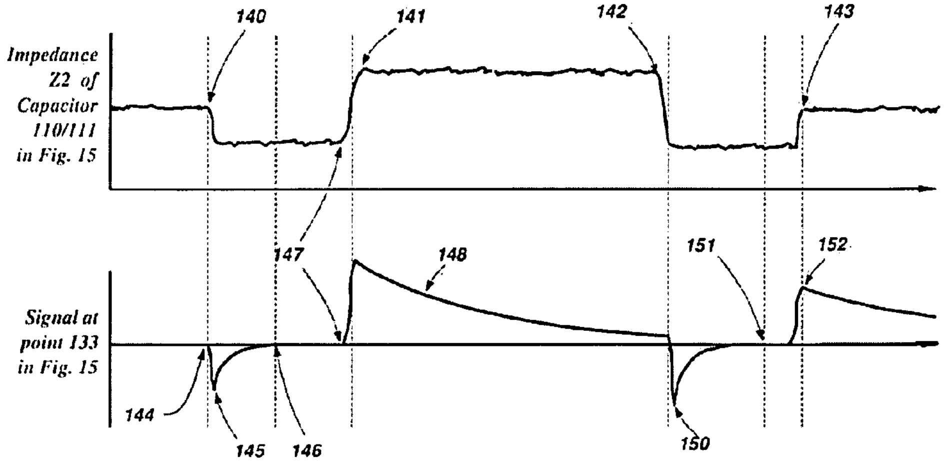
FIG. 16 shows how the signals at two of the points in the circuit of FIG. 15 might vary over time as a medication is withdrawn from the pocket.

The signals received are shown in FIG. 16. The impedance of the capacitor with the drawer closed is shown in the top chart in FIG. 16, and the signal 133 at the output of the op-amp, 123, is shown in the bottom chart in FIG. 16. As time progresses the drawer is withdrawn at point in time 144 causing a drop in capacitance at 140 with an accompanied unbalancing of the bridge voltage, and hence the output 133 of the op-amp shown in the chart at 145. But due to the SDFR circuit the signal 133 quickly drops back to zero at 146. This signal is negative going, and so is not considered to be a "take" event. When the hand is inserted at 141 the capacitance increases and this is registered as a positive 133 signal, shown just after point 147 and only slowly decays, 148, and so is registered as a "take" and will trigger the voice prompt for the medication in that pocket to be played. At time 150 the fingers and medication are removed from the pocket, causing a sudden drop in capacitance. Again this drop causes a negative change which decays rapidly and is not considered a "take", since it is negative going.

At 151 the transaction is considered completed since a "take" in that pocket has been seen, and subsequent signals are ignored as the drawer closes. So, for example, as the drawer closes and the increased dielectric above increases the capacitance and impedance, 143, the associated increases in voltage 152 is ignored. In practice, the electronics of FIG. 15 would be more complex, including the implementation of the variable resistor circuit 131, but this could easily be accomplished by someone skilled in the art. While the bridge balance circuit of FIG. 15 is shown as an analog circuit, the logic performed in FIG. 15 could also be implemented using a microcomputer with the input signals converted to digital form, or by some combination of an analog and digital circuit.

Figure 8:
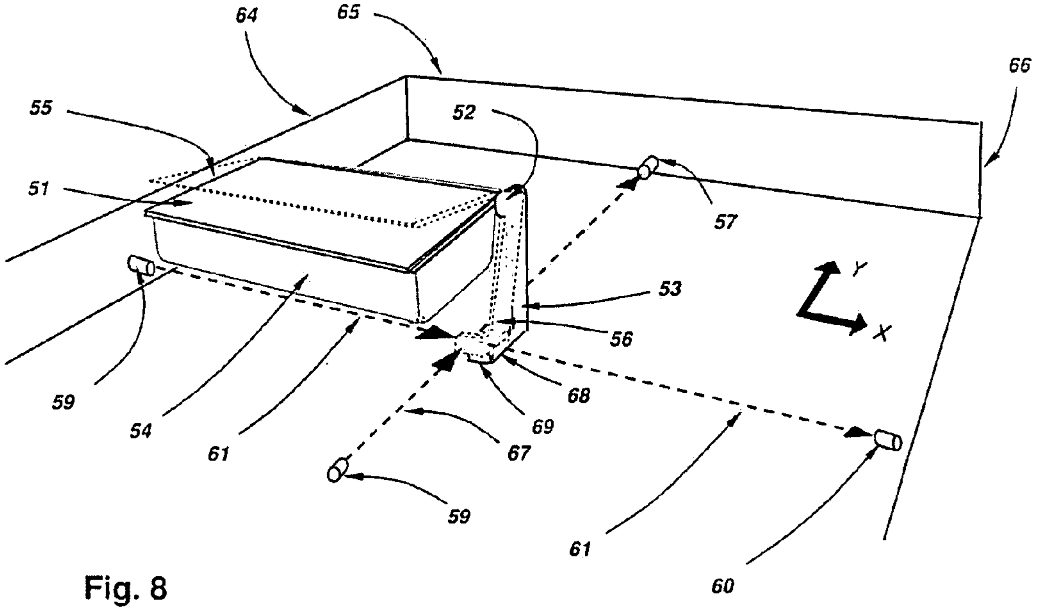
FIG. 8 is a perspective, angled view, drawing showing a mechanism and method for detecting the opening of a lid using lights and photo detectors arrayed in the X and Y row and column coordinate directions.
Figure 9:
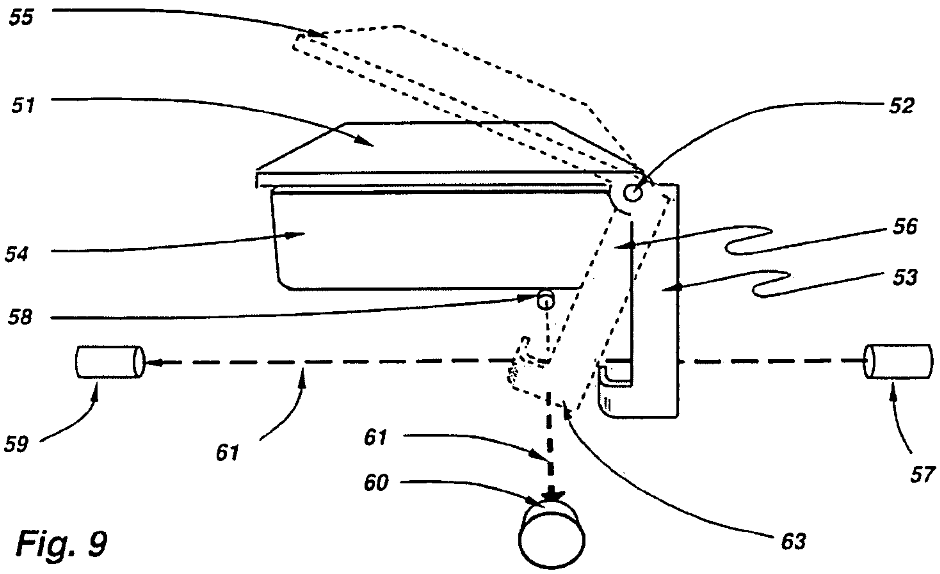
FIG. 9 is a side view, perspective drawing showing a mechanism and method for detecting the opening of a lid using lights and photo detectors arrayed in the X and Y row and column coordinate directions

FIG. 8 illustrates a method and mechanism for utilizing light detectors arrayed in an X-Y direction, to detect when the lid on an individual pocket is lifted. For simplicity only a single pocket 54 is shown with a lid, 51 and associated extension arm 53, with forward tab 68 and angled tab 69. A top through which the opening of each pocket would appear, and on which each closed lid would rest, is not shown, but this top and associated openings for each pocket would be in a horizontal plane level with the top of the pocket 54. There would be a small slot through which the extension arm 53, and other extension arms for each lid, would project down into the interior of the drawer. The side view of FIG. 9 more clearly illustrates the tab arrangement on the extension arm 53. Referring back to FIG. 8, 59 is a light source, preferably infra-red, and there would be many arrayed along the side 64 of the drawer, 60 is a corresponding detector on the opposite side, again part of a symmetrical array of detectors opposite the lights on 64. Similarly in the Y direction, light source 59 is part of an array of lights on the inside front of the draw sending a focused beam of light to corresponding detectors 57 on the back side of the drawer, part of an array of detectors along the back side 65.

With the lid 51 in closed position the light beams 61 and 67 are not interrupted, and this would be true for each pocket lid and X-Y light/detector pair combination in the drawer. However when the lid 51 starts to be opened, when it reaches position 55, shown by the dotted outline, the extension arm 53 has moved to a new position 56, and the tab 68 interrupts the light beam 61, and the tab 69 interrupts the light beam 67. Hence the light beams in the X and the Y direction, for just that position, are both interrupted, indicating that the lid has been lifted. No indication is given as to whether the lid is being opened or closed, but our interest is only in knowing at that time if the pocket is being accessed. The light interruption need not necessarily be simultaneous, but the electronics should be set up to such that, given say the X coordinate beam is interrupted first, a corresponding signal from a Y coordinate detector is received within a short period of time, which would be well under a second.

Figure 10:
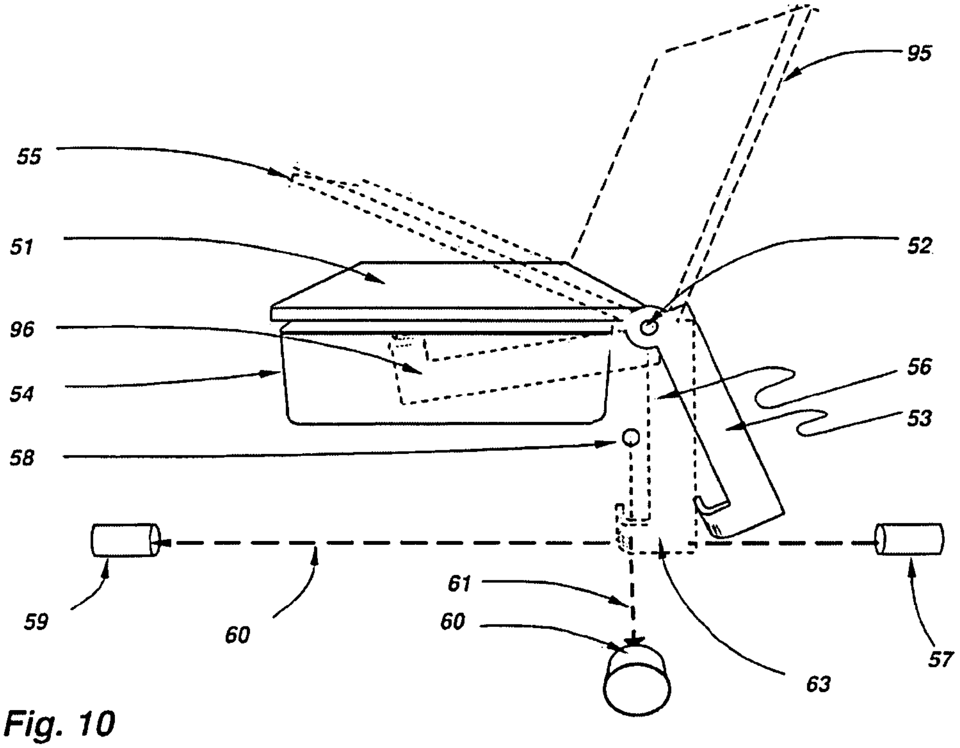
FIG. 10 is another side view, perspective drawing showing the mechanism and method of FIG. 8 for detecting the opening of a lid using lights and photo detectors arrayed in the X and Y row and column coordinate directions, with an extension that is angled back, allowing the lid to open beyond vertical.

FIG. 10 shows an improved version where the tab 53 is angled backward. This allows two things. Firstly, the breaking of the light beams by the extension arm 53 occurs when it is at the lowest position, 63, of the arc around the pivot point 52. This allows the pockets 54 to be the deepest without themselves interfering with the light beam. Secondly, when the lid is fully open in position 95 and arm 53 is stopped by the underside of the drawer top in position 96, which is level with the tops of the pockets, the weight of the lid 95 will hold the lid open, since the lid is heavier than the extension arm. This is desirable when needing to get fingers into a small pocket to take out a single medication from many.

Figure 11:
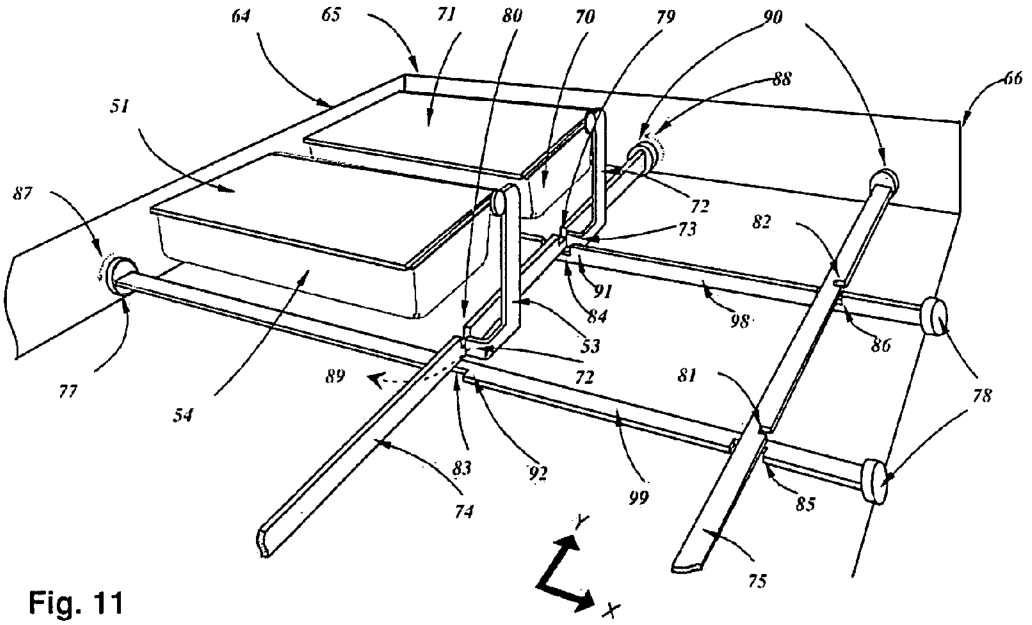
FIG. 11 is an angled view, perspective drawing showing a mechanism and method for locking one or more lids on pockets in a drawer, using an extension from the lid with a tab on it, interacting with bars in the X and Y coordinate directions, with appropriate slots cut in the bars, the bars being rotated at one end by rotary solenoids, and supported at the other end by rotary bearings.

FIG. 11 shows a mechanism and method for locking lids using an array of bars, arrayed in the X direction exemplified by 98 and 99, and the Y direction exemplified by 74, 75, which have appropriate notches in these examples 79, 80, 81, 82 and 83, 84, 85, 86 in the bars. The bars are rotated by solenoids, for example solenoid 77 for bar 99, and supported at the far end by rotary bearings 78. Similar to FIG. 8, here in FIG. 11 for simplicity only two pockets 54 and 70 are shown with lids, 51 and 71 respectively, with associated extension arm 53 with forward tab 68 and angled tab 69, and arm 72 with similar forward tabs at 73. A top surface, through which the opening of each pocket would appear, and on which each closed lid would rest, is not shown here to allow the internal workings to be seen. However, such a top surface, and the associated openings for each pocket, would be in a horizontal plane level with the top of the pockets 54 and 70. There would be a small slot through which the extensions arms 53 and 72, and other extension arms for each lid, would project down into the interior of the drawer.

Figure 13:
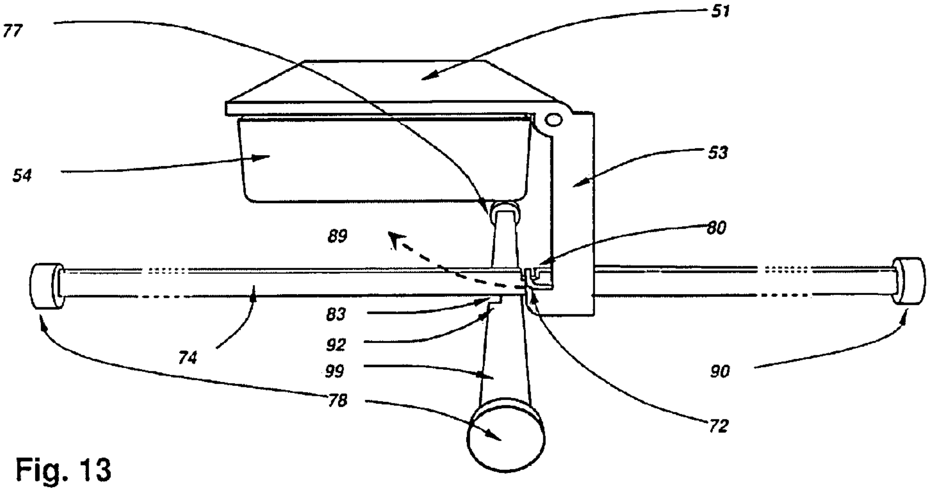
FIG. 13 is similar view to FIG. 12, but in this case, the bars in the X and the Y direction both permit the lid to open, so the lid is effectively unlocked at the X-Y intersection point of those two actuated, rotated bars, allowing the lid tab to move in the direction 89.

The normal locked position for a Y-direction bar is vertical as shown by bar 98, and for an X-direction bar, is flat as shown by bar 75. Consequently an extension arm (for a pocket not shown) at position 86 in FIG. 11 would be locked by both X and Y bars. In contrast, in FIG. 13, the X bar 99 has been rotated from its normally vertical position to a flat position by solenoid 77, removing the blocking edge 92, and the Y bar 74 has been rotated vertically by solenoid 90, removing the notch 80 from the path of the tab 72, allowing the extension arm 53 and connected lid 51 to rotate along the arc 89.

Figure 12:
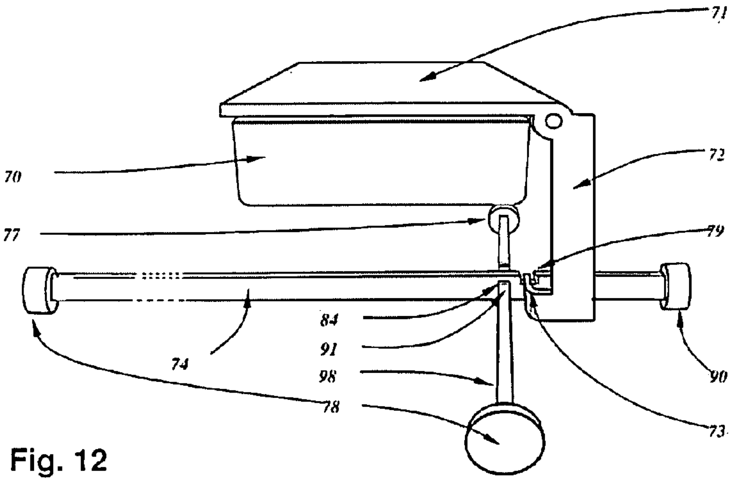
FIG. 12 is a side view, perspective drawing showing the mechanism and method of FIG. 11 for locking one or more lids on pockets in a drawer, using bars in the X and Y coordinate directions, with appropriate slots cut in the bars, the bars being capable of being rotated ninety degrees at one end by rotary solenoids, and supported at the other end by rotary bearings. In this drawing the bars in the Y direction would permit the lid to open, but the bar in the X-direction prevents the opening.

Both the X and Y bars must be in the “open” position for the arm to be free. For example, for pocket 70 and arm 72 in FIG. 11 and shown in more detail in FIG. 12, even though bar 74 is vertical and so the notch 79 has been removed from the way of the tab 73, the bar 98 remains in the vertical (locking position for Y-direction bars), and the corner 91 blocks the tab 73 and prevents the arm 72 from rotating forward.

This methodology provides economy. For an eight by eight matrix of pockets, you need sixteen rotary solenoids with this X-Y method, whereas, individual solenoids for each pocket would require sixty-four solenoids.

Figure 20:
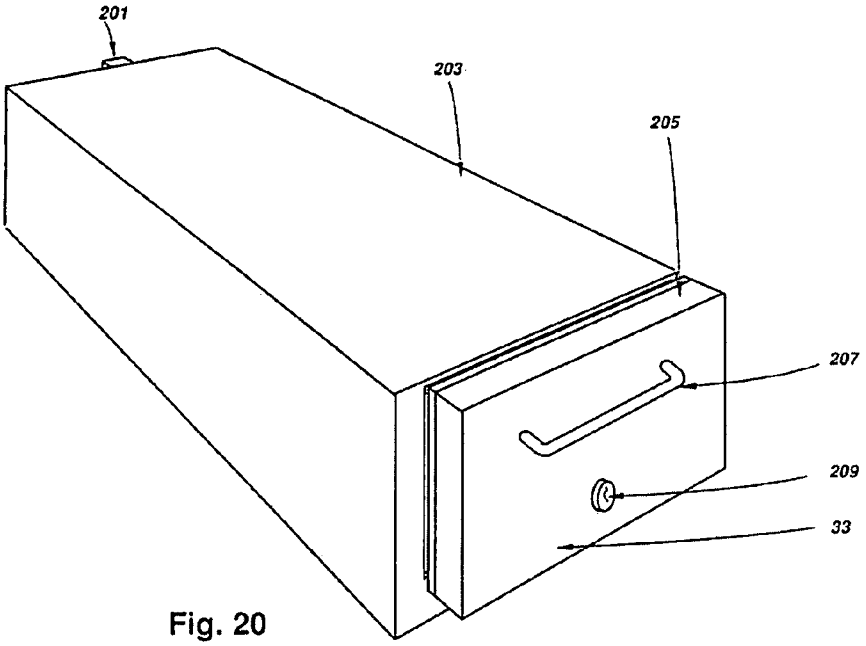
FIG. 20 shows a closed modular locking drawer for dispensing single doses.
Figure 21:
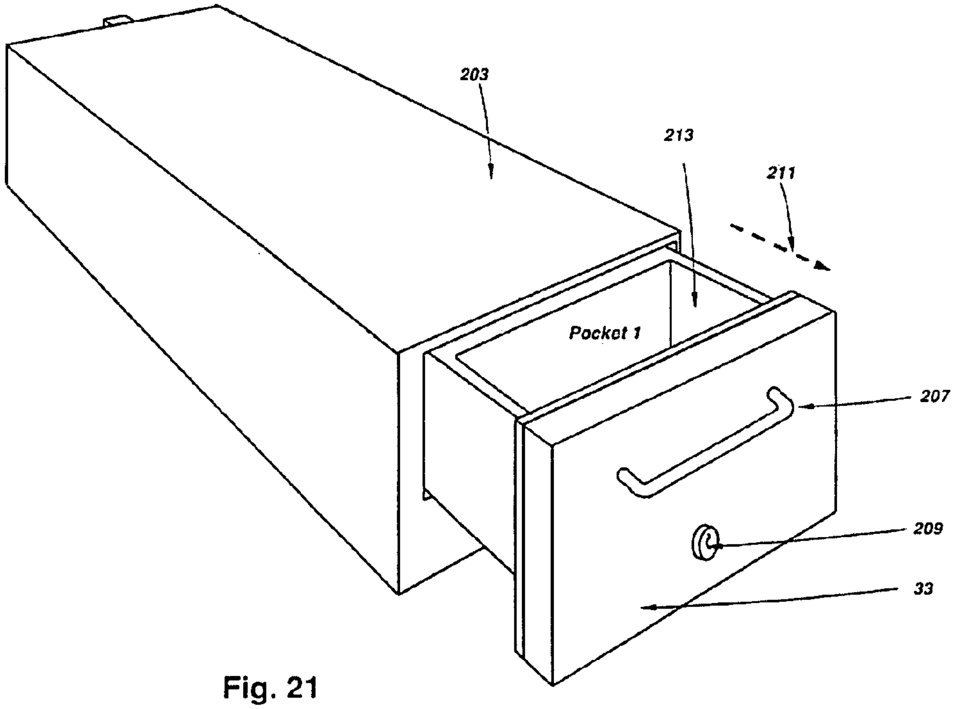
FIG. 21 shows a modular drawer partially retracted to the maximum allowed by the shuttle mechanism, to reveal Pocket 1.
Figure 22:
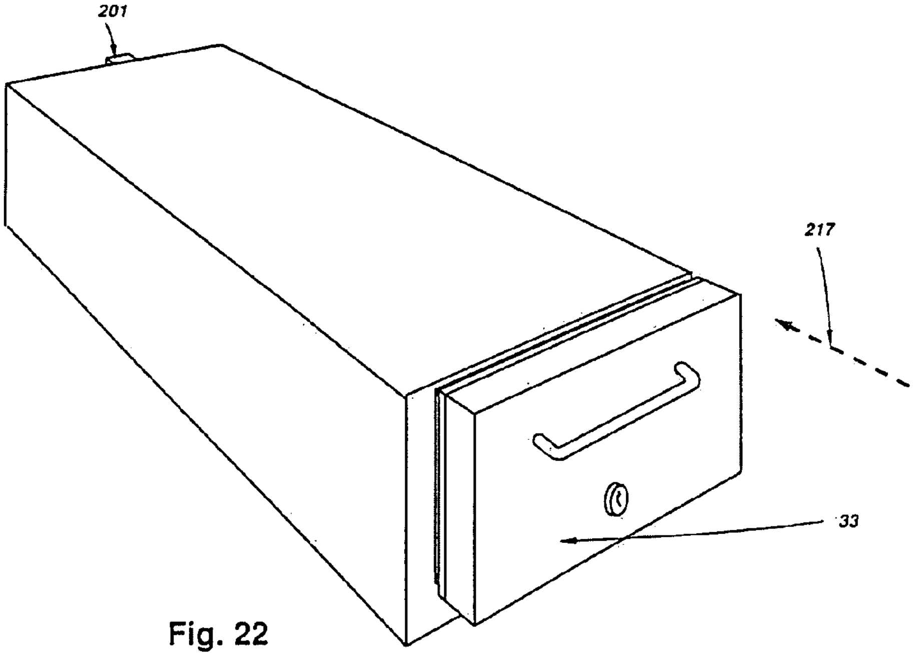
FIG. 22 shows the modular drawer fully-closed again
Figure 23:
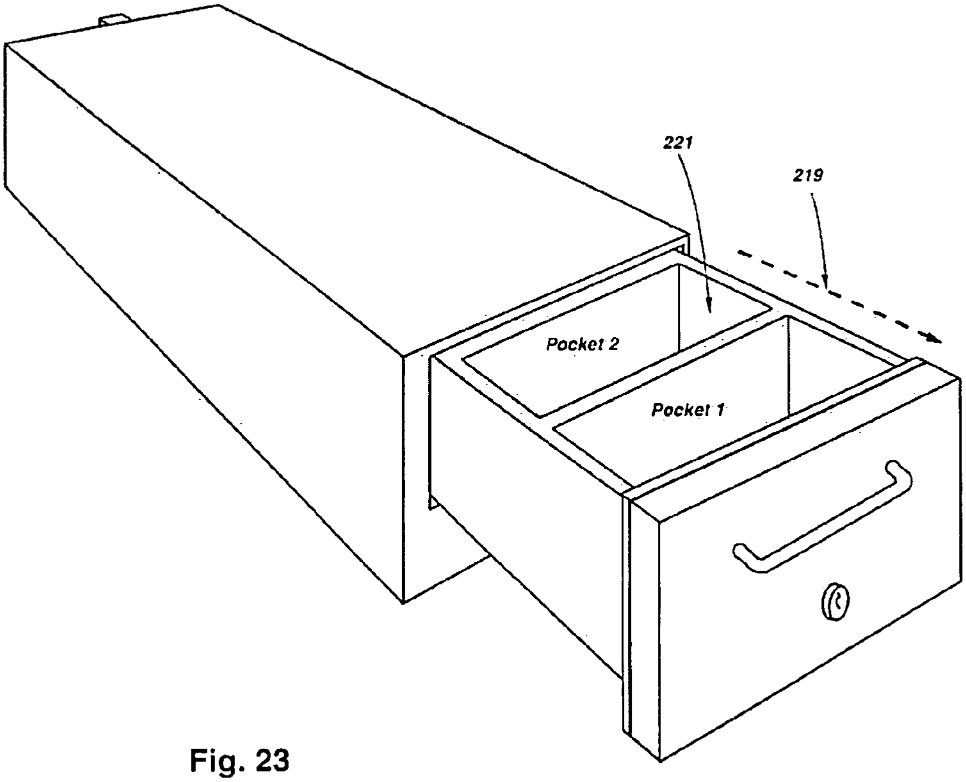
FIG. 23 shows the modular drawer now able to open to reveal both pocket 1 and pocket 2

FIG. 20 shows a modular drawer 33 that was shown in FIG. 1 and FIG. 2. The drawer in FIG. 20 is in a housing 203 that would be contained within the cabinet 1 of FIG. 1, the drawer sliding out from the housing 203 which would remain fixed relative to the cabinet 1. The drawer is held shut by a solenoid operated lock at the back of the drawer, which will be described later in this document. There is also a drawer closure detector 201. The key lock 209 shown at the front, is for the purpose of restocking the drawer, and its use will also be described later in this document. In FIG. 21, when the drawer has been restocked and is first used, the drawer only opens to reveal a single first pocket 213, containing a single medication. If the user has requested two of these medications, then the user must return the drawer to the fully closed position 217 shown in FIG. 22, at which point the sensor 201 at the back of the drawer informs the processor that one dose has been taken, and the act of closing the drawer fully, mechanically advances a shuttle mechanism within the drawer, such that when the drawer is opened again 219, as shown in FIG. 23, the second pocket is revealed, 221 allowing the second dose to be taken and so on. When the requested number of doses has been taken by opening and shutting the drawer, then on the next complete closing of the drawer, the processor, being informed that the drawer has opened and closed the requisite number of times by the sensor 201, will re-latch the solenoid at the back of the drawer, preventing the user from pulling the drawer out again and taking more doses than requested.

Figure 24:
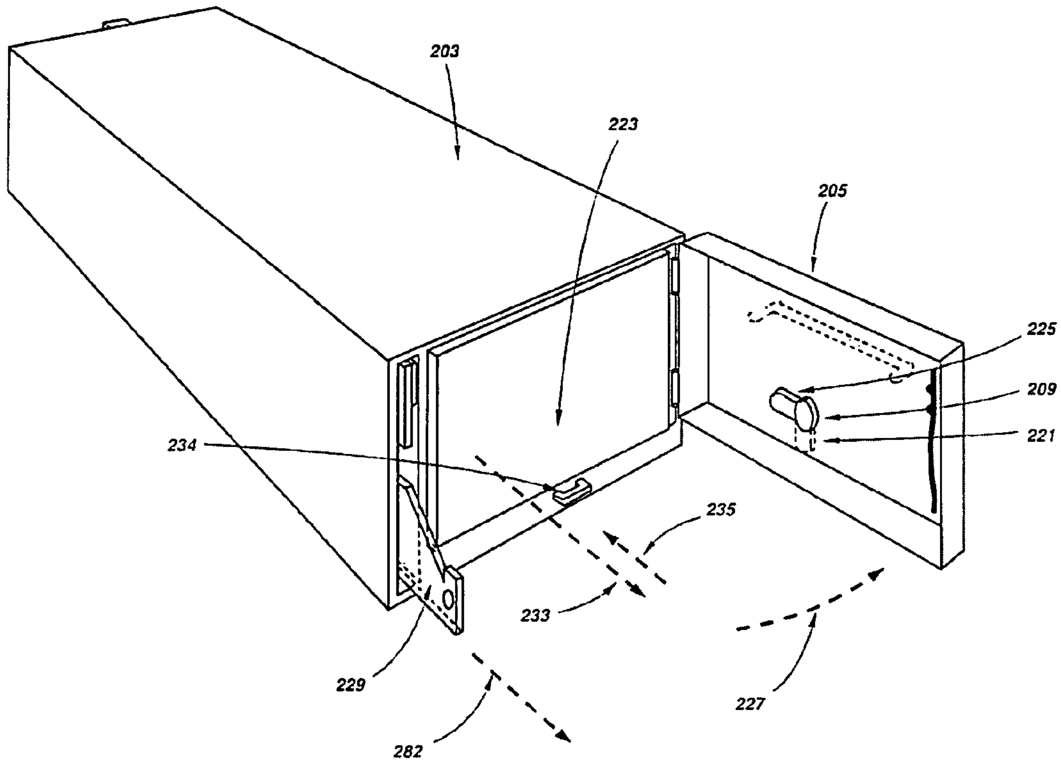
FIG. 24 shows the front of the drawer unlocked and opened to reveal the shuttle reset mechanism

At some point the drawer needs to be restocked, either because it is empty or because it is the scheduled time to re-fill what has been taken. The restock technician enters their identification into the processor and selects the restock function at which point the drawers and doors on the cabinet, to which the technician has access, unlock. The restocking an shuttle reset process is performed as shown in FIG. 24. A key is used to unlock the lock 209 moving the latch from locked position 221 to open position 225 freeing it from the slot 234, allowing the door 205 to be opened in the direction 227. A release tab 229 is pulled out and down in the direction 282, and the drawer 223, along with the attached open front cover door 205, is pulled fully open in the direction 233. Restocking of the pockets is then done, and if all the slots cannot be restocked, then doses are put at the back of the drawer. The drawer is then fully closed again, in the direction 235, and the release tab 229 is returned. The door 205 is closed and the lock 209 is locked. Since this is during the restocking process the solenoid latch at the top back of the drawer is still open. So, if the drawer was not completely restocked, the restock technician opens and closes the drawer enough times, to move the shuttle down so that the pocket before the first one that actually contains a medication in, is exposed. This is the reason that, if the drawer is not to be fully restocked, then stock is placed starting at the back, and leaving open pockets at the front. If the items were placed in the front, then at some point the drawer would reveal empty pockets at the back to the user, and there would be no easy way to prevent that. Doing it this way, the empty pockets are cleared by the restock technician, leaving the drawer set to use for the remaining doses that are present. The restock technician, having set the drawer up ready for dispensing the first dose available, then informs the processor the drawer has been restocked, the drawer is locked by the solenoid latch, and the technician moves to the next drawer. Alternatively the restock may complete all restocking, then inform the processor that they are finished, and then all locks will lock.

There are many ways to implement the method of requiring a drawer to be closed in order to advance the opening position by one, accompanied by a mechanism to reset the drawer after restocking. One embodiment is shown in FIGS. 25-33.

Figure 25:
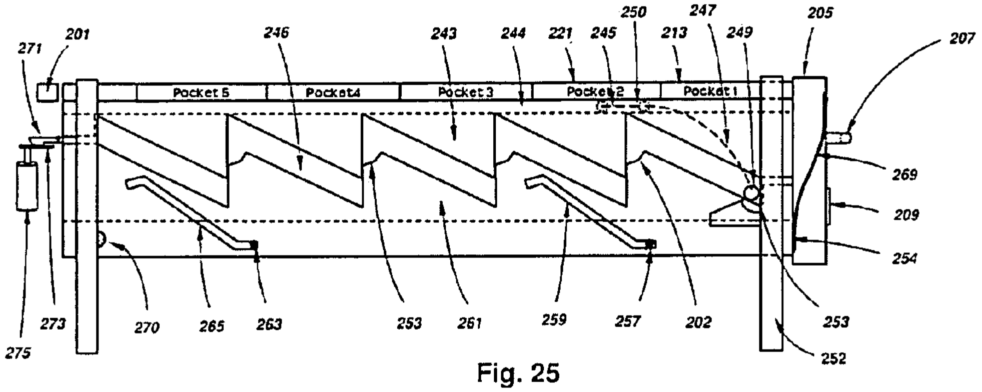
FIG. 25 shows the side view and shuttle mechanism of the closed drawer of FIG. 20, with the case removed

FIG. 25 shows the side view of the drawer, with the housing 203 of FIG. 20 removed, exposing the advancement shuttle mechanism. The positions of the top side of Pocket 1 is indicated at 213, and the top side of Pocket 2 at 221, and so on. These Pockets extend down into the body of he drawer, but are just shown at the top in this drawing to indicate their position and avoid extra lines in the drawings. There is a serrated plate 243 attached to the side of the drawer, and spaced a small distance from the side of the drawer, with enough space for a small wheeled trolley, 245, to run in a groove, 244. Extending from the trolleys is a leaf spring 247 that holds a cylindrical shuttle 249 in a downward position against the upper edge of a lower serrated plate 261. The trolley 245, spring 247 and shuttle 249 comprise a shuttle assembly 250.

The lower serrated plate, 261 slides in the plane of the side of the draw, along grooves 265 and 259, held in position by pins 263 and 257. The serrated lower plate 261 is held to its left most position at the point 254, by a leaf spring 269 on the inside of the door 205 which is normally locked by lock 209. At the back of the drawer a sensing device 201 senses when the drawer has been fully closed. This sensor could be an optical sensor or a Hall effect device or a mechanical micro-switch. There is also the option to latch the drawer. A hinged pawl 271 operates in such a way that if the drawer closes and the latch 273 is in the upward position, the pawl is shaped so that it slides over the latch and falls into the latch socket and locks. The drawer is unlocked when the solenoid 275 is operated, pulling the latch 273 down from the hook on the pawl 271. There are many other electromechanical latching arrangements available to those skilled in the art.

Figure 26:
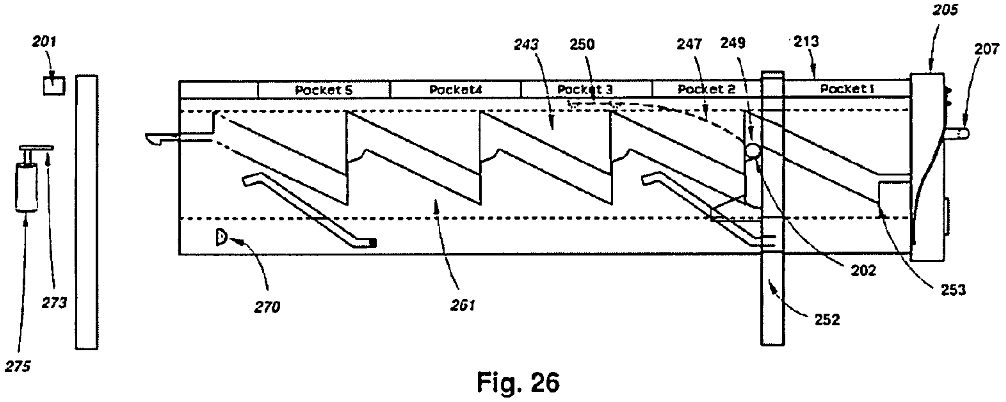
FIG. 26 shows the side view and shuttle mechanism of FIG. 25, revealing how the shuttle mechanism prevents the drawer from opening farther than Pocket 1
Figure 27:
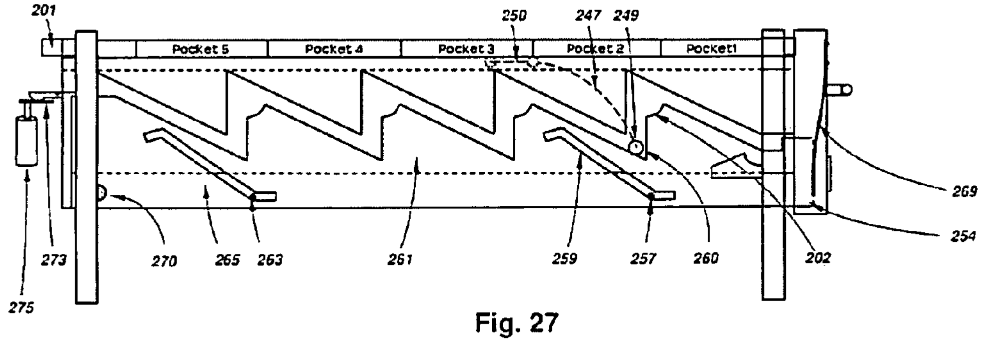
FIG. 27 shows the side view and shuttle mechanism of FIG. 25, revealing how the stop mechanism is advanced to allow the drawer to open to Pocket 2
Figure 28:
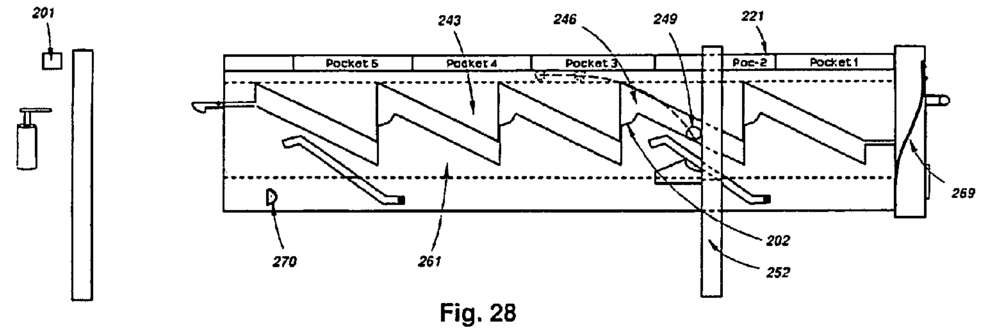
FIG. 28 shows the side view of the drawer now opening past Pocket 1 and the position of the shuttle mechanism as it moves to a new locking position
Figure 29:
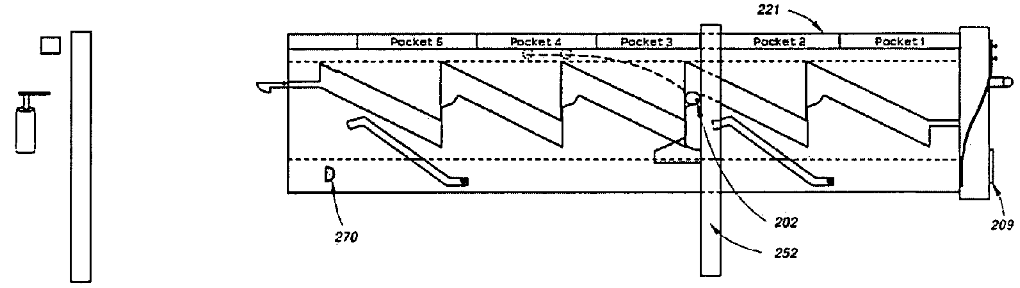
FIG. 29 shows the side view of the drawer now open to reveal pocket 2, but prevented from opening further by the new locking position of the shuttle mechanism FIG. 30 show the side view of the drawer with the front door unlocked and the reset mechanism withdrawn

Initially the shuttle is in position 253 in the groove 246 between upper serrated plate 243 and the lower serrated plate 261. Referring now to FIG. 26, as the drawer is withdrawn, the front frame of the drawer 252, pushes the shuttle 249 from position 253, up to the indentation 202 on the lower serrated plate 261. The spring 247 pushes down oil the shuttle 249, but the shuttle is trapped at this point between the top serrated plate 243 and the front frame of the drawer housing 252, and the drawer cannot be pulled further out. At this point, Pocket 1 at 213 is exposed, so the user call take the contents of that pocket. If the drawer is slid in and out without fully closing the drawer, the shuttle stays in the same position and will continue to prevent the drawer from opening further. However if the drawer is fully closed, as shown in FIG. 27, the stop 270 attached to the lower serrated plate 261, pushes the plate 261 forward relative to the side of the drawer, moving in the lower horizontal parts of the grooves 259 and 265, and pushing against the leaf spring 269. This opens a gap between the serrated plates at the position 202 and the shuttle 249 is forced down by the spring 247, to position 260. During this action the sensor 201 sends a signal to the processor that the drawer has been fully closed. If only one dose is to be taken then the solenoid 275 is release and the latch 273 will catch on the pawl 271 and the drawer will lock. If however a second dose is authorized by the processor to be taken by the user, the latch will remain unlocked, and the drawer can be opened again as show in FIG. 28. Since the pressure is off the stop 270, the spring 269 pushes the lower slidable serrated plate 261 back into its left-most position so that there is no gap at the top position 202. As the drawer is withdrawn, the front frame 252 pushes the shuttle 249, up the groove 246 created by the bottom edge of the upper serrated plate 243 and the top edge of the bottom serrated plate 261 until the shuttle 249 reaches the stop position 202. In FIG. 29 we show the shuttle at its new stopped position 202. Note that now the second pocket 221 is now exposed, but the drawer cannot be opened further unless it is fully closed again.

Figure 30:
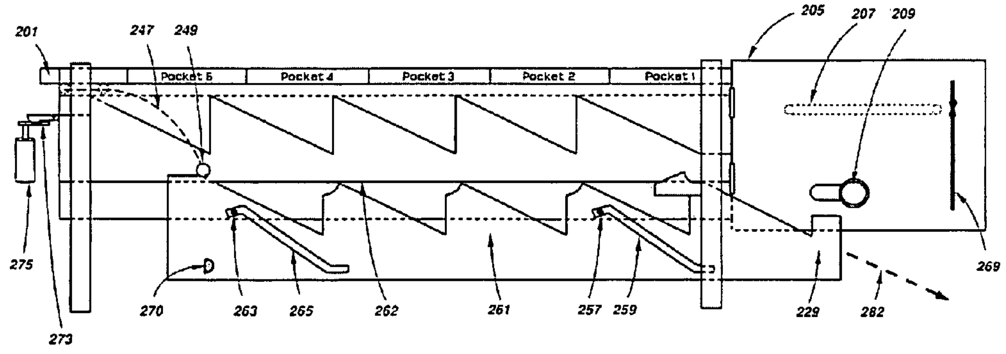
Figure 31:
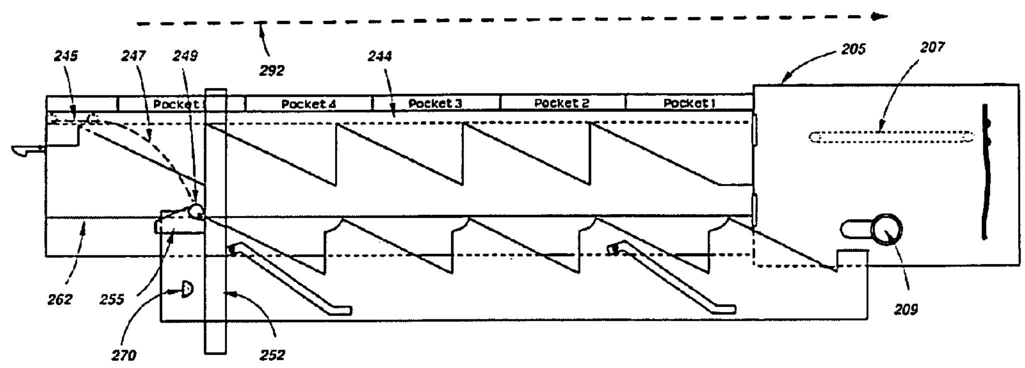
FIG. 31 shows the drawer now fully retracted with the reset mechanism withdrawn and the shuttle mechanism positioned by this full withdrawn drawer into the reset tab at the front of the drawer

We now address the issue of how to get the shuttle back when the drawer is to be restocked with items. The drawer may not be fully empty at the time of restocking. Referring to FIG. 30, the restock technician unlocks the lock 209, and opens the door 205. This is also shown in FIG. 24 as described before. Returning to FIG. 30, the technician then pulls the front tab 229 of the lower serrated bar in the direction 282, which is guided by the pins 257 and 263, running in the slots 259 and 265. The lowering of the serrated plate 261 relative to the body of the drawer in the process of pulling tab 229 forward and down, reveals the smooth surface of a fixed plate 262. The shuttle 249, pressed down by the spring 247 now rides on this smooth upper surface 262. In FIG. 31, the whole drawer is pulled out to its maximum extent in the direction 292, carrying the shuttle and everything with it. At some point, depending where the shuttle was when the restock technician started the process, the shuttle will ride up over a catch 255 attached to the drawer frame 252, and the shuttle will cease to move forward. As the drawer is then completely withdrawn, the shuttle trolley 245 will be driven to the back of the moving drawer, the shuttle itself staying caught in the notch created by 255 and the stationary front frame 252. Eventually the drawer is prevented from being withdrawn further by the shuttle assembly reaching the back of the groove 244.

Figure 32:
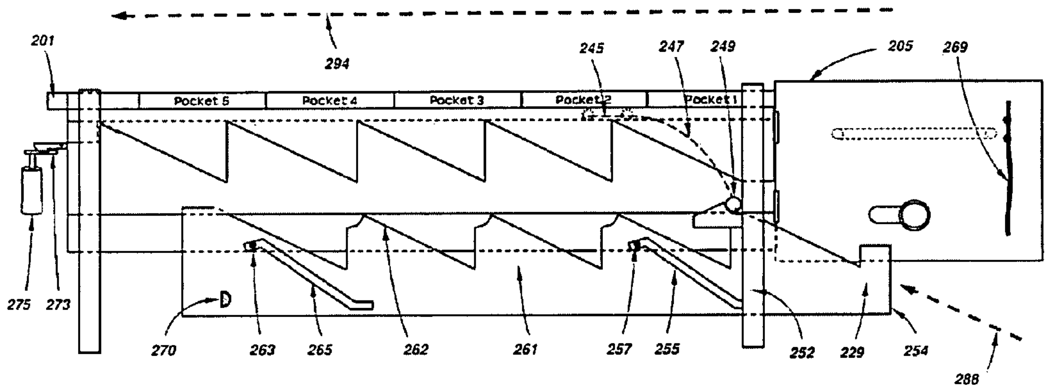
FIG. 32 shows the drawer now closed with the reset mechanism withdrawn and how the shuttle mechanism remains reset at the front of the drawer.
Figure 33:
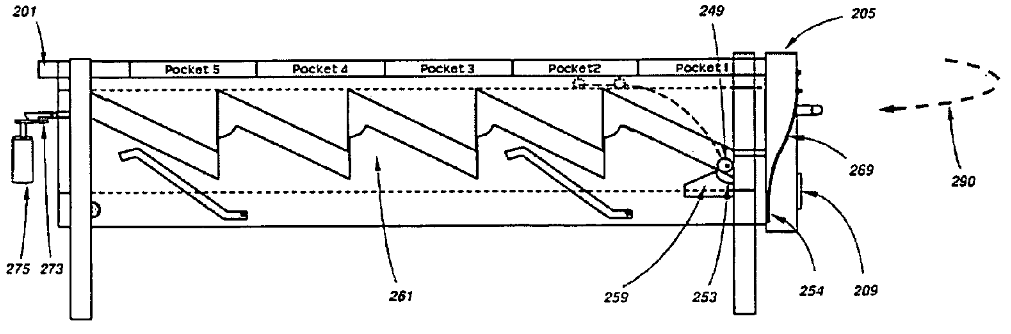
FIG. 33 shows the reset mechanism returned into operational position, and the drawer door closed and locked over it, leaving the drawer reset and ready for use again

In FIG. 32 the drawer is now closed in the direction 294, and because the shuttle 249 is caught in the notch between 255 and the front frame of the drawer 252, the shuttle assembly 245 stays fixed in space relative to the draw frame 252, and so moves to the front relative to the closing drawer. The serrated lower plate 261 is then put back in position in the direction 288 using the tab 229, guided up into position by grooves 255 and 265 riding on the pins 257 and 263, and the plate 261. In FIG. 33, the plate 261 is kept in place by closing the door 205 and locking it which causes the leaf spring 269 to press on the front edge 254 of 261. The top edge of the plate, 261, lifts the shuttle 249 up off the notch tab 255 to the position 253 return the mechanism to the state shown in FIG. 25. The drawer is now set for use again If the restock technician does not have enough product to completely re-fill the drawer, they will fill from the back. This might leave, for example, two empty pockets at the front, and the first medication in pocket 3. During the restock process the processor will keep the drawer unlocked. Consequently, starting from the restocked position of FIG. 33, the restock technician will simply open and close the drawer twice to advance the shuttle, so that the next opening, for a user, will reveal the medication in Pocket 3.

Other mechanisms can be created to implement the method of requiring a drawer to be closed in order to advance the opening position by one, accompanied by a mechanism to reset the drawer after restocking. One system would utilize a belt and another would utilize a miniature form of bicycle chain.

The invention claimed is:

1. A method for dispensing pharmaceutical or medical supply items from a unit comprising a cabinet having a processor and a plurality of retractable drawers, which are covered by one or more lockable doors at least some of the drawers having one or more pockets for holding items, the method comprising:

identifying a user that is requesting access to the pharmaceutical or medical supply items held in the dispensing cabinet by receiving user identification information into the processor;

entering pharmaceutical or medical supply item identification information into the processor to identify the items the user wishes to remove from the cabinet;

comparing the user identification information with an access list having information as to which of the requested pharmaceutical or medical supply items to which the user may be given access based on the previously entered user identification information to determine one or more of the locked doors to which the user may be given access;

unlocking one of the doors having have the drawer behind it that contains at least one of the requested pharmaceutical or medical supply items if the access list indicates that the user may have access to the door having the requested pharmaceutical or medical supply item;

opening the unlocked door;

withdrawing the desired drawer;

activating an indicator at the side of the drawer to indicate which row contains the pocket which holds the pharmaceutical or medical supply items that the user has requested to remove;

activating an indicator along the front of the drawer to indicate which column contains the pocket which holds the pharmaceutical or medical supply items that the user has requested to remove;

identifying the right pocket by observing the pocket at the intersection of the indicated row and indicated column; and removing the requested pharmaceutical or medical supply item from the pocket, wherein access to the pocket is detected by a sensor or other measurement which causes a pre-recorded sound file to be played to the user.

2. The method of claim 1 where a second array of row indicators is placed on the side of the drawer opposite the first so that the row is indicated at both ends.

3. The method of claim 1 where a second array of column indicators is placed on the cabinet frame just above the drawer, so that the column of interest is indicated at both ends of the exposed portion of the drawer.

4. The method of claim 1 where the indicator is a light.

5. The method of claim 4 where the indicator is a light emitting diode.

6. The method of claim 4 where the light seen by the user is delivered by a light pipe.

7. The method of claim 1 where the indicator is an electromechanical device that moves a tab such that the color shown is changed.

8. The method of claim 1 where the door that is unlocked is shown to be unlocked by a light on the cabinet.

9. The method of claim 8 where that light is aligned to also indicates which drawer to open.

10. The method of claim 1 where at least some of the pockets have lids.

11. The method of claim 10 where at least some of the lids are locked and only the pocket containing the pharmaceutical or medical supply items that the user has requested to remove, is unlocked.

12. The method of claim 1 where the access to the pocket causes text to speech to be played to the user.

13. The method of claim 1 where the packet has a lid, the opening of which can be sensed by the processor.

14. The method of claim 13 where the detection mechanism is by an array of sources and receivers in the Y-row and X-column directions and the opening is detected by the interruption of a row signal and a column signal.

15. The method of claim 1 where the detection mechanism is a capacitance bridge, and the change in capacitance when the fingers of a hand are inserted into the pocket is detected by the change in capacitance.

16. The method of claim 11 where the locking mechanism is by an array of bars in the Y-row direction and the X-column direction, where the actuation of a specific bar in the row direction and another specific bar in the column direction unlocks a single pocket at the intersection of the row and column.

17. The method of claim 1 where one or more video cameras are activated when the user enters their identification into the processor, and are deactivated when the user has completed the whole transaction.

18. The method of claim 16 where a recorded video file is made a part of the transaction record stored in the processor, for later retrieval and review.

19. A system for dispensing pharmaceutical or medical supply items from a unit comprising a cabinet having a processor and a plurality of retractable drawers, which are covered by one or more lockable doors at least some of the drawers having one or more pockets for holding items, the system comprising:

identifying a user that is requesting access to the pharmaceutical or medical supply items held in the dispensing cabinet by receiving user identification information into the processor;

entering pharmaceutical or medical supply item identification information into the processor to identify the items the user wishes to remove from the cabinet;

comparing the user identification information with an access list having information as to which of the requested pharmaceutical or medical supply items to which the user may be given access based on the previously entered user identification information to determine one or more of the locked doors to which the user may be given access;

unlocking one of the doors having have the drawer behind it that contains at least one of the requested pharmaceutical or medical supply items if the access list indicates that the user may have access to the door having the requested pharmaceutical or medical supply item;

opening the unlocked door;

withdrawing the desired drawer;

activating an indicator at the side of the drawer to indicate which row contains the pocket which holds the pharmaceutical or medical supply items that the user has requested to remove;

activating an indicator along the front of the drawer to indicate which column contains the pocket which holds the pharmaceutical or medical supply items that the user has requested to remove;

identifying the right pocket by observing the pocket at the intersection of the indicated row and indicated column; and, removing the requested pharmaceutical or medical supply item from the pocket, where access to the rocket is detected by a sensor or other measurement which causes a pre-recorded sound file to be played to the user.

20. The system of claim 19 where a second array of row indicators is placed on the side of the drawer opposite the first so that the row is indicated at both ends.

21. The system of claim 19 where a second array of column indicators is placed on the cabinet frame just above the drawer, so that the column of interest is indicated at both ends of the exposed portion of the drawer.

22. The system of claim 19 where the indicator is a light.

23. The system of claim 22 where the indicator is a light emitting diode.

24. The system of claim 22 where the light seen by the user is delivered by a light pipe.

25. The system of claim 19 where the indicator is an electromechanical device that moves a tab such that the color shown is changed.

26. The system of claim 19 where the door that is unlocked is shown to be unlocked by a light on the cabinet.

27. The system of claim 26 where that light is aligned to also indicates which drawer to open.

28. The system of claim 19 where at least some of the pockets have lids.

29. The system of claim 28 where at least some of the lids are locked and only the pocket containing the pharmaceutical or medical supply items that the user has requested to remove, is unlocked.

30. The system of claim 19 where the access to the pocket causes text to speech to be played to the user.

31. The system of claim 19 where the pocket has a lid, the opening of which can be sensed by the processor.

32. The system of claim 31 where the detection mechanism is by an array of sources and receivers in the Y-row and X-column directions and the opening is detected by the interruption of a row signal and a column signal.

33. The system of claim 19 where the detection mechanism is a capacitance bridge, and the change in capacitance when the fingers of a hand are inserted into the pocket is detected by the change in capacitance.

34. The system of claim 29 where the locking mechanism is by an array of bars in the Y-row direction and the X-column direction, where the actuation of a specific bar in the row direction and another specific bar in the column direction unlocks a single pocket at the intersection of the row and column.

35. The system of claim 19 where one or more video cameras are activated when the user enters their identification into the processor, and are deactivated when the user has completed the whole transaction.

36. The system of claim 35 where a recorded video file is made a part of the transaction record stored in the processor, for later retrieval and review.

37. A method for dispensing pharmaceutical or medical supply items from a unit comprising a cabinet having a processor and a plurality of retractable drawers, which are covered by one or more lockable doors at least some of the drawers having one or more pockets for holding items, the method comprising:

identifying a user that is requesting access to the pharmaceutical or medical supply items held in the dispensing cabinet by receiving user identification information into the processor;

entering pharmaceutical or medical supply item identification information into the processor to identify the items the user wishes to remove from the cabinet;

comparing the user identification information with an access list having information as to which of the requested pharmaceutical or medical supply items to which the user may be given access based on the previously entered user identification information to determine one or more of the locked doors to which the user may be given access;

unlocking one of the doors having have the drawer behind it that contains at least one of the requested pharmaceutical or medical supply items if the access list indicates that the user may have access to the door having the requested pharmaceutical or medical supply item;

opening the unlocked door;

withdrawing the desired drawer;

activating an indicator at the side of the drawer to indicate which row contains the pocket which holds the pharmaceutical or medical supply items that the user has requested to remove;

activating an indicator along the front of the drawer to indicate which column contains the pocket which holds the pharmaceutical or medical supply items that the user has requested to remove;

identifying the right pocket by observing the pocket at the intersection of the indicated row and indicated column; and removing the requested pharmaceutical or medical supply item from the pocket, wherein access to the pocket is detected by a sensor or other measurement which causes text to speech to be played to the user.

38. The method of claim 37 where a second array of row indicators is placed on the side of the drawer opposite the first so that the row is indicated at both ends.

39. The method of claim 37 where a second array of column indicators is placed on the cabinet frame just above the drawer, so that the column of interest is indicated at both ends of the exposed portion of the drawer.

40. The method of claim 37 where the indicator is a light.

41. The method of claim 40 where the indicator is a light emitting diode.

42. The method of claim 40 where the light seen by the user is delivered by a light pipe.

43. The method of claim 37 where the indicator is an electromechanical device that moves a tab such that the color shown is changed.

44. The method of claim 37 where the door that is unlocked is shown to be unlocked by a light on the cabinet.

45. The method of claim 44 where that light is aligned to also indicates which drawer to open.

46. The method of claim 37 where at least some of the pockets have lids.

47. The method of claim 46 where at least some of the lids are locked and only the pocket containing the pharmaceutical or medical supply items that the user has requested to remove, is unlocked.

48. The method of claim 37 where access to the pocket causes a pre-recorded sound file to be played to the user.

49. The method of claim 37 where the packet has a lid, the opening of which can be sensed by the processor.

50. The method of claim 49 where the detection mechanism is by an array of sources and receivers in the Y-row and X-column directions and the opening is detected by the interruption of a row signal and a column signal.

51. The method of claim 37 where the detection mechanism is a capacitance bridge, and the change in capacitance when the fingers of a hand are inserted into the pocket is detected by the change in capacitance.

52. The method of claim 47 where the locking mechanism is by an array of bars in the Y-row direction and the X-column direction, where the actuation of a specific bar in the row direction and another specific bar in the column direction unlocks a single pocket at the intersection of the row and column.

53. The method of claim 37 where one or more video cameras are activated when the user enters their identification into the processor, and are deactivated when the user has completed the whole transaction.

54. The method of claim 52 where a recorded video file is made a part of the transaction record stored in the processor, for later retrieval and review.

55. A system for dispensing pharmaceutical or medical supply items from a unit comprising a cabinet having a processor and a plurality of retractable drawers, which are covered by one or more lockable doors at least some of the drawers having one or more pockets for holding items, the system comprising:

identifying a user that is requesting access to the pharmaceutical or medical supply items held in the dispensing cabinet by receiving user identification information into the processor;

entering pharmaceutical or medical supply item identification information into the processor to identify the items the user wishes to remove from the cabinet;

comparing the user identification information with an access list having information as to which of the requested pharmaceutical or medical supply items to which the user may be given access based on the previously entered user identification information to determine one or more of the locked doors to which the user may be given access;

unlocking one of the doors having have the drawer behind it that contains at least one of the requested pharmaceutical or medical supply items if the access list indicates that the user may have access to the door having the requested pharmaceutical or medical supply item;

opening the unlocked door;

withdrawing the desired drawer;

activating an indicator at the side of the drawer to indicate which row contains the pocket which holds the pharmaceutical or medical supply items that the user has requested to remove;

activating an indicator along the front of the drawer to indicate which column contains the pocket which holds the pharmaceutical or medical supply items that the user has requested to remove;

identifying the right pocket by observing the pocket at the intersection of the indicated row and indicated column; and, removing the requested pharmaceutical or medical supply item from the pocket, where access to the pocket is detected by a sensor or other measurement which causes text to speech to be played to the user.

56. The system of claim 55 where a second array of row indicators is placed on the side of the drawer opposite the first so that the row is indicated at both ends.

57. The system of claim 55 where a second array of column indicators is placed on the cabinet frame just above the drawer, so that the column of interest is indicated at both ends of the exposed portion of the drawer.

58. The system of claim 55 where the indicator is a light.

59. The system of claim 58 where the indicator is a light emitting diode.

60. The system of claim 58 where the light seen by the user is delivered by a light pipe.

61. The system of claim 55 where the indicator is an electromechanical device that moves a tab such that the color shown is changed.

62. The system of claim 55 where the door that is unlocked is shown to be unlocked by a light on the cabinet.

63. The system of claim 62 where that light is aligned to also indicates which drawer to open.

64. The system of claim 55 where at least some of the pockets have lids.

65. The system of claim 64 where at least some of the lids are locked and only the pocket containing the pharmaceutical or medical supply items that the user has requested to remove, is unlocked.

66. The system of claim 55 where the access to the pocket causes a pre-recorded sound file to be played to the user.

67. The system of claim 55 where the pocket has a lid, the opening of which can be sensed by the processor.

68. The system of claim 67 where the detection mechanism is by an array of sources and receivers in the Y-row and X-column directions and the opening is detected by the interruption of a row signal and a column signal.

69. The system of claim 55 where the detection mechanism is a capacitance bridge, and the change in capacitance when the fingers of a hand are inserted into the pocket is detected by the change in capacitance.

70. The system of claim 64 where the locking mechanism is by an array of bars in the Y-row direction and the X-column direction, where the actuation of a specific bar in the row direction and another specific bar in the column direction unlocks a single pocket at the intersection of the row and column.

71. The system of claim 55 where one or more video cameras are activated when the user enters their identification into the processor, and are deactivated when the user has completed the whole transaction.

72. The system of claim 71 where a recorded video file is made a part of the transaction record stored in the processor, for later retrieval and review.

* * * * *